United States Patent
Hu et al.

(10) Patent No.: US 9,728,780 B2
(45) Date of Patent: Aug. 8, 2017

(54) LAYERED OXIDE MATERIAL, PREPARATION METHOD, ELECTRODE PLATE, SECONDARY BATTERY AND USE

(71) Applicant: INSTITUTE OF PHYSICS, THE CHINESE ACADEMY OF SCIENCES, Beijing (CN)

(72) Inventors: Yongsheng Hu, Beijing (CN); Linqin Mu, Beijing (CN); Liquan Chen, Beijing (CN)

(73) Assignee: INSTITUTE OF PHYSICS, THE CHINESE ACADEMY OF SCIENCES, Beijing (CN)

( * ) Notice: Subject to any disclaimer, the term of this patent is extended or adjusted under 35 U.S.C. 154(b) by 19 days.

(21) Appl. No.: 14/913,389

(22) PCT Filed: Jun. 18, 2015

(86) PCT No.: PCT/CN2015/081816
§ 371 (c)(1),
(2) Date: Feb. 22, 2016

(87) PCT Pub. No.: WO2016/058402
PCT Pub. Date: Apr. 21, 2016

(65) Prior Publication Data
US 2016/0293945 A1    Oct. 6, 2016

(30) Foreign Application Priority Data
Oct. 16, 2014    (CN) .......................... 2014 1 0549896

(51) Int. Cl.
*H01M 4/02* (2006.01)
*H01M 4/485* (2010.01)
(Continued)

(52) U.S. Cl.
CPC .......... *H01M 4/485* (2013.01); *H01M 4/131* (2013.01); *H01M 4/505* (2013.01); *H01M 4/525* (2013.01);
(Continued)

(58) Field of Classification Search
CPC ....................................................... H01M 4/02
See application file for complete search history.

(56) References Cited

FOREIGN PATENT DOCUMENTS

| CN | 103456936 | * 12/2013 |
| CN | 103456936 A | 12/2013 |

(Continued)

OTHER PUBLICATIONS

International Search Report (PCT/ISA/210) issued on Aug. 26, 2015, by the Chinese Patent Office as the International Searching Authority for International Application No. PCT/CN2015/081816.
(Continued)

*Primary Examiner* — Jacob Marks
(74) *Attorney, Agent, or Firm* — Na Xu; IPro, PLLC

(57) ABSTRACT

A layered oxide material, a preparation method, an electrode, a secondary battery and use are disclosed. The layered oxide material has a general chemical formula $Na_xCu_iFe_jMn_kM_yO_{2+\beta}$, in which M is an element that is doped for replacing the transition metals; x, y, i, j, k, and β are respectively the molar ratios of respective elements, provided that x, y, i, j, k, and β satisfy the relations: $y+i+j+k=1$, and $x+my+2i+3j+4k=2(2+\beta)$, where $0.8 \leq x \leq 1$, $0<i \leq 0.3$, $0<j \leq 0.5$, $0<k \leq 0.5$, $0.02 \leq \beta \leq 0.02$, and m is the valence of M. The layered oxide material has a space group of R3̄m.

10 Claims, 14 Drawing Sheets

(51) Int. Cl.
*H01M 4/131* (2010.01)
*H01M 4/505* (2010.01)
*H01M 4/525* (2010.01)
*H01M 10/054* (2010.01)

(52) U.S. Cl.
CPC .... *H01M 10/054* (2013.01); *H01M 2004/028* (2013.01); *H01M 2220/10* (2013.01)

(56) References Cited

FOREIGN PATENT DOCUMENTS

CN 103579605 A 2/2014
WO WO 2014/009722 A1 1/2014

OTHER PUBLICATIONS

Written Opinion (PCT/ISA/237) issued on Aug. 26, 2015, by the Chinese Patent Office as the International Searching Authority for International Application No. PCT/CN2015/081816.

* cited by examiner

LAYERED OXIDE MATERIAL, PREPARATION METHOD, ELECTRODE PLATE, SECONDARY BATTERY AND USE

BACKGROUND

Technical Field

The present invention relates to the field of material technologies, and particularly to a layered oxide material, a preparation method, an electrode, a secondary battery and use.

Related Art

With the shortage of non-renewable energy resources including petroleum and coal and the exacerbation of environmental pollution, development of clean energy resources become a topic receiving great attention worldwide. A critical solution to this topic is to develop wind and solar energy resources and energy storage batteries provided therefor. The existing electrochemical energy storage devices mainly include lead-acid batteries, nickel-zinc batteries, nickel-hydrogen batteries, flow batteries and lithium-ion batteries, For most of the lithium-ion secondary batteries, a lithium-ion intercalation compound is used as a positive or negative electrode material, and a dry organic solvent is used as an electrolyte; and the lithium ions are reversibly deintercalated from the positive and negative electrode active material repeatedly without destroying the material structure. Lithium-ion batteries are generally accepted as the most promising power batteries for electric vehicles and energy storage batteries for renewable energy resources due to their high working voltage (3.6 V) (that is 3 times of that of nickel-cadmium and nickel-hydrogen batteries); small volume (that is 30% lower than nickel-hydrogen batteries); light weight (that is 50% lighter than nickel-hydrogen batteries); high specific energy (200 Wh/kg) (that is 2-3 times of that of nickel-cadmium batteries); lack of memory effect and pollution, low self discharge, and long cycling life. However, due to the limited lithium resources and the high extraction cost, the lithium-ion batteries are expensive, thus being failed to satisfy the low cost requirement in large-scale application. In contrast, the element sodium from the same main group has extremely similar physical and chemical properties to lithium, and has a higher abundance than lithium in the earth's crust and thus the cost of sodium-ion batteries is low. Therefore, development of sodium-ion secondary batteries as large-scale energy storage devices becomes a good choice.

In recent years, because of the limited lithium resources and the abundant sodium resources, sodiumion secondary batteries are extensively researched. At present, use of sodium as the electrode material of sodiumion batteries is reported in numerous literatures, in which the positive electrode material mainly includes $Na_3V_2(PO_4)_3$ having a NASCION-type structure [Electrochem. Commun., 2012, 14, 86-89, Adv. Energy Mater., 2013, 3, 156-160], $NaVPO_4$, $Na_3V_2(PO_4)_2F_3$[J. Mater. Chem., 2012, 22, 20535-20541], $Na_3V_2O_2(PO_4)_2F$, and $NaTi_2(PO_4)_3$. However, since such materials have a quite low electron conductivity and a poor kinetic performance, nanonization and carbon coating are frequently required to realize stable cycling. Moreover, the element vanadium contained therein is toxic, such that these materials have difficulty in practical application. A $Na_4Mn_9O_{18}$ material with a tunnel structure is initially proposed by et al. [Adv. Mater., 2011, 23, 3155-3160], in which the movable sodium ions reside in an S-shaped large channel, Such a structure is quite stable during the whole cycle and can stand 2000 rounds of long cycles. However, the average voltage of the overall positive electrode material is low and the capacity is low because this structure mainly functions relying on the change from trivalent to tetravalent manganese, and the original sodium content is low.

Layered positive electrode material also receives great attention in recent years. P2-type $Na_xTMO_2$ and O3-type $NaTMO_2$ are the mostly extensively studied materials [Physical B&C, 1980, 99, 81-85]. The O3-type material has a high sodium content in the O3 phase and a high charge capacity in initial cycle, but a poor electrochemical cycling performance and is sensitive to the air and water, such that it has difficulty in practical use. The P2-type material is highly stable during electrochemical cycle and has a fast deintercalation of sodium ions due to the large space where sodium ions reside. However, most of the P2-type materials are not stable in the air, and the charge capacity in initial cycle is generally low because the sodium content is low. In 2001, a P2-type $Na_{2/3}Ni_{1/3}Mn_{2/3}O_2$ material was prepared and characterized for its electrochemical performance by Lu et al, and was found to have a capacity of 160 mAh/g between 2.0-4.5V [Z. H. Lu and J. R. Dahn, J. Electrochem. Soc., 2001, 148A, 1225-A1229]. However, multiple plateaus appear on the electrochemical curve, and the cycling stability is extremely poor.

Moreover, the existing layered oxide cannot achieve a high charge capacity in initial cycle, a high efficiency, a high rate capability, and a good cycling performance unless nickel or cobalt is contained as a valence-variable element. However, the compounds containing the two elements are expensive, toxic, and undesirable for environment.

SUMMARY

An embodiment of the present invention provides a layered oxide material, a preparation method, an electrode, a secondary battery and use. The layered oxide material can be simply prepared, and contains transition metal elements including copper, iron, and manganese that are nontoxic and safe and have a high abundance in the earth's crust, and thus the preparation cost is low. Sodium-ion secondary batteries using the layered oxide material according to the present invention have a high Coulombic efficiency in initial cycles, an excellent cycling performance, and a high safety performance, and thus are of great utility value in solar power generation, wind power generation, peak load regulation of smart power grid, and large-scale energy storage equipment such as distribution power stations, backup power sources, or communication base stations.

In a first aspect, an embodiment of the present invention provides a layered oxide material having a general chemical formula $Na_xCu_iFe_jMn_kM_yO_{2+\beta}$, where M is an element that is doped for replacing the transition metals, and is specifically one or more of $Li^+$, $Ni^{2+}$, $Mg^{2+}$, $Mn^{2+}$, $Co^{2+}$, $Ca^{2+}$, $Ba^{2+}$, $Sr^{2+}$, $Mn^{3+}$, $Al^{3+}$, $B^{3+}$, $Cr^{3+}$, $Co^{3+}$, $V^{3+}$, $Zr^{4+}$, $Ti^{4+}$, $Sn^{4+}$, $V^{4+}$, $Mo^{4+}$, $Mo^{5+}$, $Ru^{4+}$, $Nb^{5+}$, $Si^{4+}$, $Sb^{3+}$, $Nb^{5+}$, $Mo^{6+}$, and $Te^{6+}$; and x, y, i, j, k, and β are respectively the molar ratios of respective elements, provided that x, y, j, k, and β satisfy the relations: $y+i+j+k=1$, and $x+my+2i+3j+4k=2(2+\beta)$, where $0.8 \leq x \leq 1$, $0 < i \leq 0.3$, $0 \leq j \leq 0.5$, $0 < k \leq 0.5$, $-0.02 \leq \beta \leq 0.02$, and m is the valence of M.

The layered oxide material has a space group $R\bar{3}m$.

Preferably, the layered oxide material is a positive electrode for use in sodium-ion secondary batteries.

In a second aspect, an embodiment of the present invention provides a method for preparing the layered oxide material according to the first aspect through a solid-state reaction. The method comprises:

mixing 100-108 wt % of the desired stoichiometric amount of sodium carbonate based on sodium and the desired stoichiometric amounts of cupric oxide, ferric oxide, manganese dioxide and M oxide in proportion to form a precursor, where M is specifically one or more of $Li^+$, $Ni^{2+}$, $Mg^{2+}$, $Mn^{2+}$, $Zn^{2+}$, $Co^{2+}$, $Ca^{2+}$, $Ba^{2+}$, $Sr^{2+}$, $Mn^{3+}$, $Al^{3+}$, $B^{3+}$, $Cr^{3+}$, $Co^{3+}$, $V^{3+}$, $Zr^{4+}$, $Ti^{4+}$, $Sn^{4+}$, $V^{4+}$, $Mo^{4+}$, $Mo^{5+}$, $Ru^{4+}$, $Nb^{5+}$, $Si^{4+}$, $Sb^{5+}$, $Nb^{5+}$, $Mo^{6+}$, and $Te^{6+}$;

uniformly mixing the precursor by ball milling, to obtain a precursor powder;

placing the precursor powder in a muffle furnace, and heating at 700-1000° C. for 2-24 hrs in the air atmosphere; and grinding the heat-processed precursor powder, to obtain the layered oxide material.

In a third aspect, an embodiment of the present invention provides a method for preparing the layered oxide material according to the first aspect through spray drying. The method comprises:

mixing 100-108 wt % of the desired stoichiometric amount of sodium carbonate based on sodium and the desired stoichiometric amounts of cupric oxide, ferric oxide, manganese dioxide and M oxide in proportion to form a precursor, where M is specifically one or more of $Li^+$, $Ni^{2+}$, $Mg^{2+}$, $Mn^{2+}$, $Zn^{2+}$, $Co^{2+}$, $Ca^{2+}$, $Ba^{2+}$, $Sr^{2+}$, $Mn^{3+}$, $Al^{3+}$, $B^{3+}$, $Cr^{3+}$, $Co^{3+}$, $V^{3+}$, $Zr^{4+}$, $Ti^{4+}$, $Sn^{4+}$, $V^{4+}$, $Mo^{4+}$, $Mo^{5+}$, $Ru^{5+}$, $Nb^{5+}$, $Si^{4+}$, $Sb^{5+}$, $Nb^{5+}$, $Mo^{6+}$, and $Te^{6+}$;

adding ethanol or water to the precursor and stirring until uniform to form a slurry;

subjecting the slurry to spray drying, to obtain a precursor powder;

placing the precursor powder in a muffle furnace, and heating at 60-1000° C. for 2-24 hrs in the air atmosphere; and grinding the heated precursor powder, to obtain the layered oxide material.

In a fourth aspect, an embodiment of the present invention provides a method for preparing the layered oxide material according to the first aspect through spray drying. The method comprises:

using sodium nitrate, cupric nitrate, ferric nitrate, manganese acetate, and M nitrate at stoichiometric ratios as a precursor, where M is specifically one or more of $Li^+$, $Ni^{2+}$, $Mg^{2+}$, $Mn^{2+}$, $Zn^{2+}$, $Co^{2+}$, $Ca^{2+}$, $Ba^{2+}$, $Sr^{2+}$, $Mn^{3+}$, $Al^{3+}$, $B^{3+}$, $Cr^{3+}$, $Co^{3+}$, $V^{3+}$, $Zr^{4+}$, $Ti^{4+}$, $Sn^{4+}$, $V^{4+}$, $Mo^{4+}$, $Mo^{5+}$, $Ru^{5+}$, $Nb^{5+}$, $Si^{4+}$, $Sb^{5+}$, $Nb^{5+}$, $Mo^{6+}$, and $Te^{6+}$;

adding ethanol or water to the precursor and stirring until uniform to form a slurry;

subjecting the shin, to spray drying, to obtain a precursor powder;

placing the precursor powder in a muffle furnace, and heating at 650-1000° C. for 2-24 hrs in the air atmosphere; and grinding the heated precursor powder, to obtain the layered oxide material.

In a fifth aspect, an embodiment of the present invention provides a method for preparing the layered oxide material according to the first aspect through sol-gel process. The method comprises:

dissolving 100-108 wt % of the desired stoichiometric amount of sodium acetate, sodium nitrate, sodium carbonate, or sodium sulfate based on sodium, and cupric, ferric, manganese and the doped element M nitrate or sulfate at stoichiometric ratios in water or ethanol and mixing to form a precursor solution, where M is specifically one or more of $Li^+$, $Ni^{2+}$, $Mg^{2+}$, $Mn^{2+}$, $Zn^{2+}$, $Co^{2+}$, $Ca^{2+}$, $Ba^{2+}$, $Sr^{2+}$, $Mn^{3+}$, $Al^{3+}$, $B^{3+}$, $Cr^{3+}$, $Co^{3+}$, $V^{3+}$, $Zr^{4+}$, $Ti^{4+}$, $Sn^{4+}$, $V^{4+}$, $Mo^{4+}$, $Mo^{5+}$, $Ru^{5+}$, $Nb^{5+}$, $Si^{4+}$, $Sb^{5+}$, $Nb^{5+}$, $Mo^{6+}$, and $Te^{6+}$;

stirring at 50-100° C., adding a suitable amount of a chelating agent, and drying to form a precursor gel;

placing the precursor gel in a crucible, and presintering at 200-500° C. for 2 hrs in the air atmosphere;

further heating at 600-1000° C. for 2-24 hrs; and grinding the heated precursor powder, to obtain the layered oxide material.

In a sixth aspect, an embodiment of the present invention provides a method for preparing the layered oxide material according to the first aspect through co-precipitation. The method comprises:

dissolving cupric, ferric, manganese and M nitrate, sulfate, carbonate, or hydroxide at the desired stoichiometric ratios in deionized water respectively, to form a solution separately;

slowly adding the solution dropwise by means of a peristaltic pump to an aqueous ammonia solution with a certain concentration and pH, to generate a precipitate;

washing the obtained precipitate with deionized water, oven drying, and uniformly mixing with sodium carbonate at a stoichiometric ratio, to obtain a precursor;

placing the precursor in a crucible, and heating at 600-1000° C. for 6-24 hrs in the air atmosphere, to obtain a precursor powder; and grinding the heated precursor powder, to obtain the layered oxide material.

In a seventh aspect, an embodiment of the present invention provides a positive electrode for a sodium-ion secondary battery. The positive electrode comprises:

a current collector, a conductive additive coated on the current collector, a binder, and the layered oxide material according to the first aspect thereon.

In an eighth aspect, an embodiment of the present invention provides a sodium-ion secondary battery having the positive electrode according to the seventh aspect.

In a ninth aspect, an embodiment of the present invention provides use of the sodium-ion secondary battery according to the eighth aspect in solar power generation, wind power generation, peak load regulation of smart power grid, and large-scale energy storage equipment such as distribution power stations, backup power sources, or communication base stations.

The layered oxide material provided in the embodiments of the present invention can be simply prepared, and contains transition metal elements including copper, iron, and manganese that are nontoxic and safe and have a high abundance in the earth's crust, and thus the preparation cost is low. The sodium-ion secondary battery using the layered oxide material according to the present invention has a high charge capacity in initial cycle, an excellent cycle performance, and a high safety, by virtue of the valence change from divalent copper to trivalent copper, from trivalent iron to tetravalent iron, and from trivalent manganese to tetravalent manganese, and thus are of great utility value in solar power generation, wind power generation, peak load regulation of smart power grid, and large-scale energy storage equipment such as distribution power stations, backup power sources, or communication base stations.

BRIEF DESCRIPTION OF THE DRAWINGS

The technical solutions provided in embodiments of the present invention are described in further detail by way of examples with reference to drawings, in which.

DETAILED DESCRIPTION

The present invention is described in further detail in connection with embodiments which, however, are not intended to limit the protection scope of the present invention.

Embodiment 1

Embodiment 1 of the present invention provides a layered oxide material having a general chemical formula $Na_xCu_iFe_jMn_kM_yO_{2+\beta}$;

where M is an element that is doped for replacing the transition metals, and is specifically one or more $Li^+$, $Ni^{2+}$, $Mg^{2+}$, $Mn^{2+}$, $Zn^{2+}$, $Co^{2+}$, $Ca^{2+}$, $Ba^{2+}$, $Sr^{2+}$, $Mn^{3+}$, $Al^{3+}$, $B^{3+}$, $Cr^{3+}$, $Co^{3+}$, $V^{3+}$, $Zr^{4+}$, $Ti^{4+}$, $Sn^{4+}$, $V^{4+}$, $Mo^{4+}$, $Mo^{5+}$, $Ru^{4+}$, $Nb^{5+}$, $Si^{4+}$, $Sb^{5+}$, $Nb^{5+}$, $Mo^{6+}$, and $Te^{6+}$; and x, y, i, j, k, and $\beta$ are respectively the molar ratios of respective elements, provided that x, y, i, j, k, and $\beta$ satisfy the relations: $y+i+j+k=1$, and $x+my+2i+3j+4k=2(2+\beta)$, where $0.8 \le x \le 1$, $0 < i \le 0.3$; $0 < j \le 0.5$, $0 < k \le 0.5$, $-0.02 \le \beta \le 0.02$, and m is the valence of M.

The layered oxide material has a space group of $R\bar{3}m$.

Figure 1:
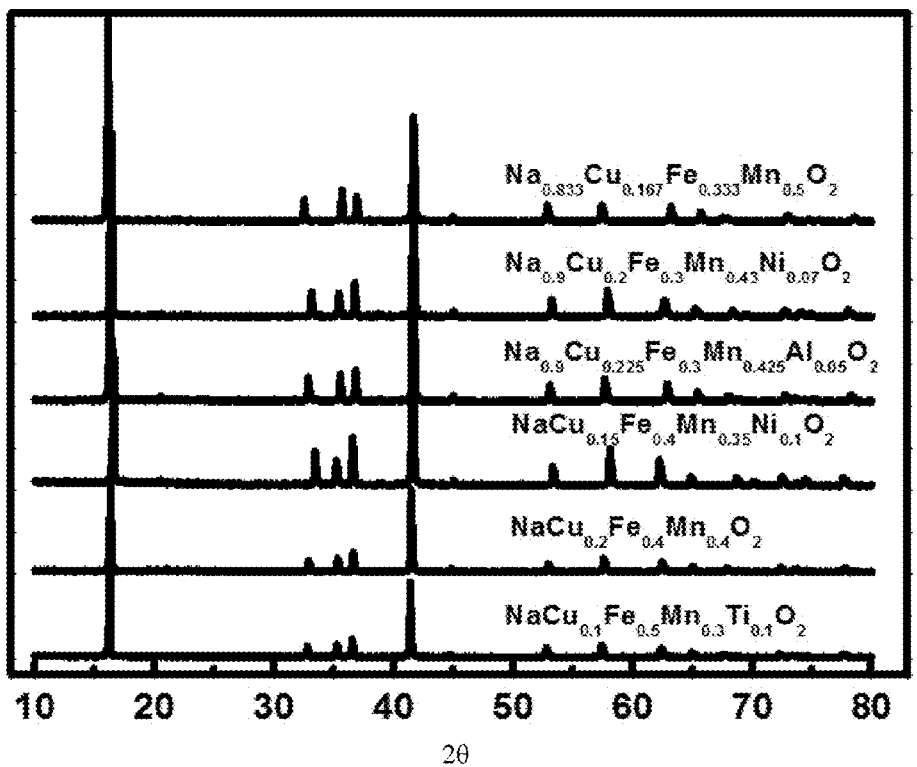
FIG. 1 is an XRD pattern of a plurality of layered oxide materials having different molar percentages of elements provided in Embodiment 1 of the present invention.

FIG. 1 is an X-ray diffraction (XRD) pattern of a plurality of layered oxide materials having different molar percentages of elements. It can be seen from the XRD pattern that $Na_xCu_iFe_jMn_kM_yO_{2+\beta}$ provided in this embodiment is an oxide having a layered-structured $O_3$ phase in its crystal structure.

The layered oxide material provided in this embodiment can be simply prepared, and contains transition metal elements including copper, iron, and manganese that are nontoxic and safe and have a high abundance in the earth's crust, and thus the preparation cost is low. The layered oxide material may find use as positive electrode active material of sodium-ion secondary batteries. The sodium-ion secondary battery using the layered oxide material according to the present invention has a high charge capacity in initial cycle, an excellent cycle performance, and a high safety, by virtue of the valence change from divalent to trivalent copper, from trivalent to tetravalent iron, and from trivalent to tetravalent manganese, and thus are of great utility value.

Embodiment 2

Figure 2:
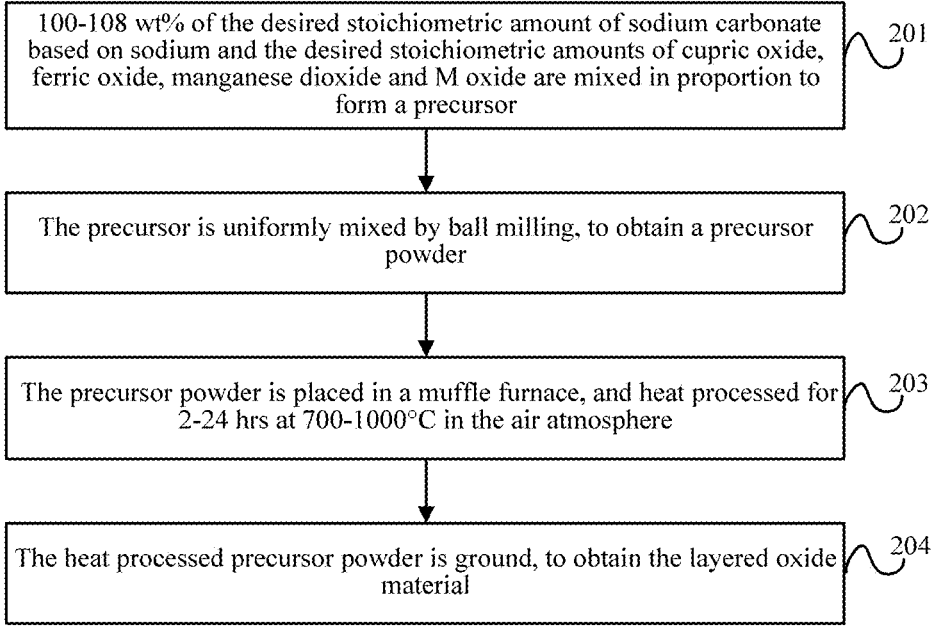
FIG. 2 is a flow chart of a method for preparing a layered oxide material through solid-state reaction process provided in Embodiment 2 of the present invention.

This embodiment provides a method for preparing a layered oxide material, which is specifically a solid-state reaction, and includes the following steps as shown in FIG. 2.

Step 201—100-108 wt % of the desired stoichiometric amount of sodium carbonate based on sodium and the desired stoichiometric amounts of cupric oxide, ferric oxide, manganese dioxide and M oxide are mixed in proportion to form a precursor.

Specifically, M is one or more of $Li^+$, $Ni^{2+}$, $Mg^{2+}$, $Mn^{2+}$, $Zn^{2+}$, $Co^{2+}$, $Ca^{2+}$, $Ba^{2+}$, $Sr^{2+}$, $Mn^{3+}$, $Al^{3+}$, $B^{3+}$, $Cr^{3+}$, $Co^{3+}$, $V^{3+}$, $Zr^{4+}$, $Ti^{4+}$, $Sn^{4+}$, $V^{4+}$, $Mo^{4+}$, $Mo^{5+}$, $Ru^{5+}$, $Nb^{5+}$, $Si^{4+}$, $Sb^{5+}$, $Nb^{5+}$, $Mo^{6+}$, and $Te^{6+}$.

Step 202—The precursor is uniformly mixed by ball milling, to obtain a precursor powder.

Step 203—The precursor powder is placed in a muffle furnace, and heated for 2-24 hrs at 700-1000° C. in the air atmosphere.

Step 204—The heated precursor powder is ground, to obtain the layered oxide material.

The method for preparing a layered oxide material provided in this embodiment is useful in the preparation of the layered oxide material according to Embodiment 1. The method provided in this embodiment is simple and feasible, the cost is low and the materials used are safe and nontoxic, so that the method is applicable to large-scale production.

Embodiment 3

Figure 3:
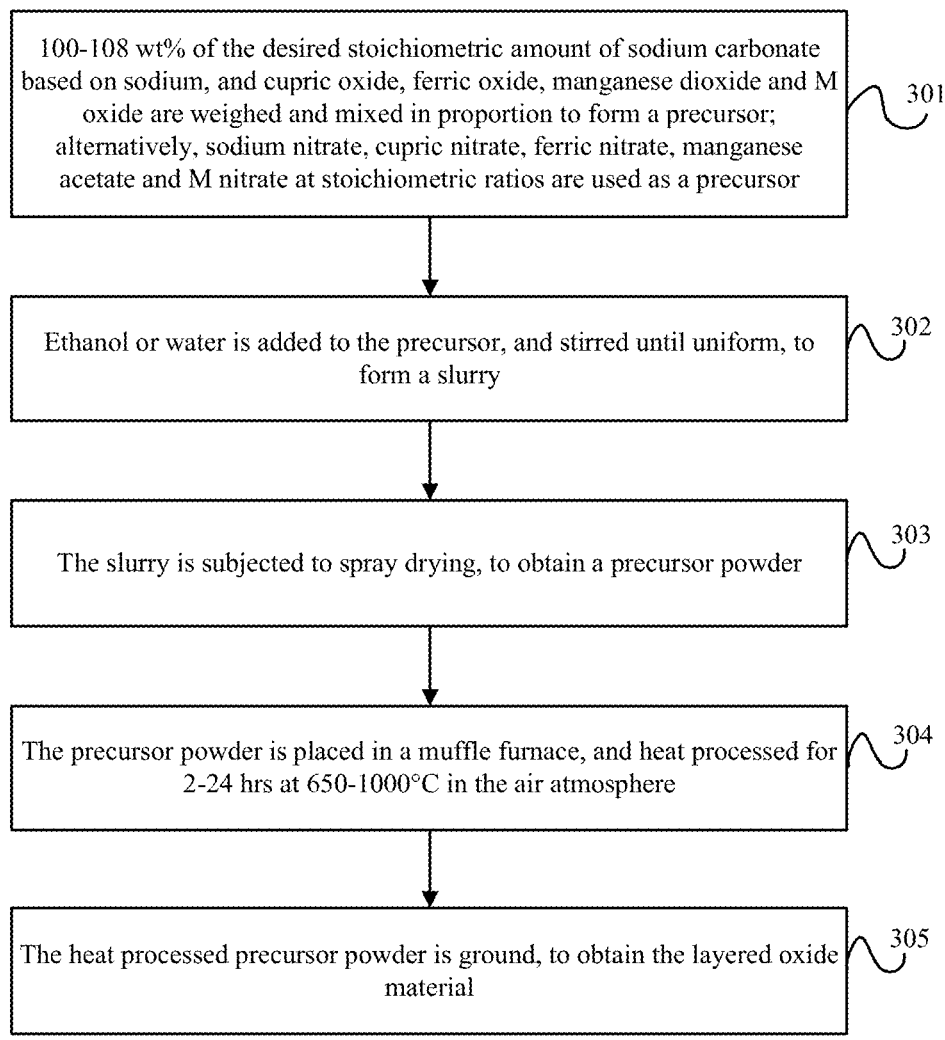
FIG. 3 is a flow chart of a method for preparing a layered oxide material through spray drying provided in Embodiment 3 of the present invention.

This embodiment provides a method for preparing a layered oxide material, which is specifically spray drying, and includes the following steps as shown in FIG. 3.

Step 301—100-108 wt % of the desired stoichiometric amount of sodium carbonate based on sodium, and cupric oxide, ferric oxide, manganese dioxide and M oxide are weighed and mixed in proportion to form a precursor. Alternatively, sodium nitrate, cupric nitrate, ferric nitrate, manganese acetate and M nitrate at stoichiometric ratios are used as a precursor Specifically, M may be one or more of $Li^+$, $Ni^{2+}$, $Mg^{2+}$, $Mn^{2+}$, $Zn^{2+}$, $Co^{2+}$, $Ca^{2+}$, $Ba^{2+}$, $Sr^{2+}$, $Mn^{3+}$, $Al^{3+}$, $B^{3+}$, $Cr^{3+}$, $Co^{3+}$, $V^{3+}$, $Zr^{4+}$, $Ti^{4+}$, $Sn^{4+}$, $V^{4+}$, $Mo^{4+}$, $Mo^{5+}$, $Ru^{5+}$, $Nb^{5+}$, $Si^{4+}$, $Sb^{5+}$, $Nb^{5+}$, $Mo^{6+}$, and $Te^{6+}$.

Step 302—Ethanol or water is added to the precursor, and stirred until uniform, to form a slurry.

Step 303—The slurry is subjected to spray drying, to obtain a precursor powder.

Step 304—The precursor powder is placed in a muffle furnace, and heated for 2-24 hrs at 650-1000° C. in the air atmosphere.

Step 305—The heated precursor powder is ground, to obtain the layered oxide material.

The method for preparing a layered oxide material provided in this embodiment is useful in the preparation of the layered oxide material according to Embodiment 1. The method provided in this embodiment is simple and feasible, the cost is low and the materials used are safe and nontoxic, so that the method is applicable to large-scale production.

Embodiment 4

Figure 4:
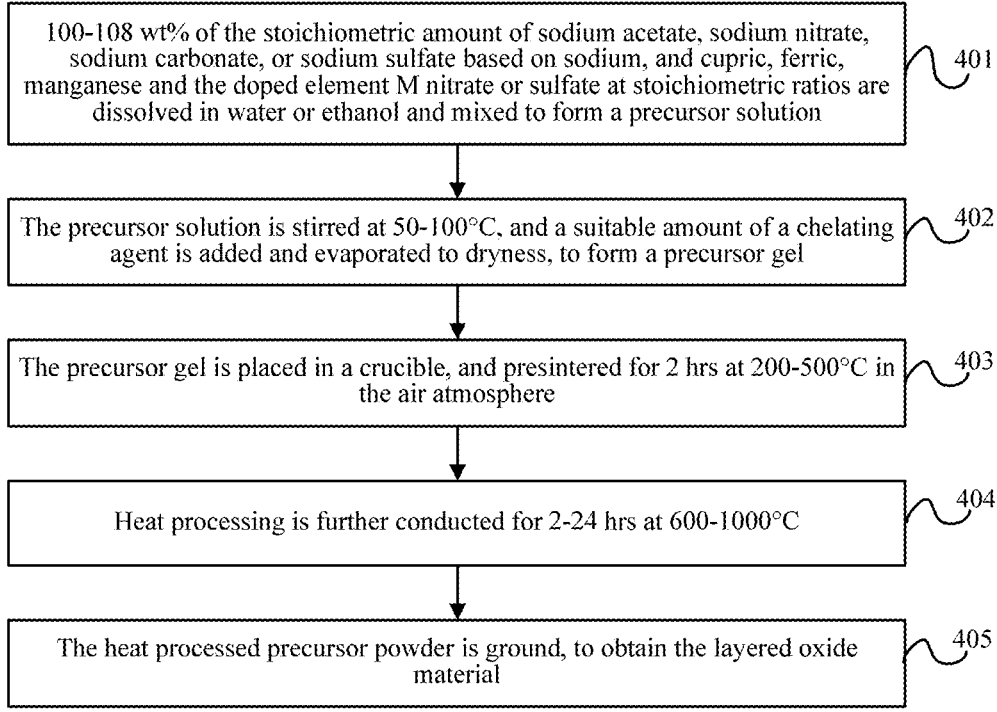
FIG. 4 is a flow chart of a method for preparing a layered copper-containing oxide material through sol-gel process provided in Embodiment 4 of the present invention.

This embodiment provides a method for preparing a layered oxide material, which is specifically a sol-gel process, and includes the following steps as shown in FIG. 4.

Step 401—100-108 wt % of the stoichiometric amount of sodium acetate, sodium nitrate, sodium carbonate, or sodium sulfate based on sodium, and cupric, ferric, manganese and the doped element M nitrate or sulfate at stoichiometric ratios are dissolved in water or ethanol and mixed to form a precursor solution.

M is specifically one or more of $Li^+$, $Ni^{2+}$, $Mg^{2+}$, $Mn^{2+}$, $Zn^{2+}$, $Co^{2+}$, $Ca^{2+}$, $Ba^{2+}$, $Sr^{2+}$, $Mn^{3+}$, $Al^{3+}$, $B^{3+}$, $Cr^{3+}$, $Co^{3+}$, $V^{3+}$, $Zr^{4+}$, $Ti^{4+}$, $Sn^{4+}$, $V^{4+}$, $Mo^{4+}$, $Mo^{5+}$, $Ru^{5+}$, $Nb^{5+}$, $Si^{4+}$, $Sb^{5+}$, $Nb^{5+}$, $Mo^{6+}$, and $Te^{6+}$.

Step 402—The precursor solution is stirred at 50-100° C. and a suitable amount of a chelating agent is added and evaporated to dryness, to form a precursor gel.

Step 403—The precursor gel is placed in a crucible, and presintered for 2 hrs at 200-500° C. in the air atmosphere.

Step 404—Heating is further conducted for 2-24 hrs at 600-1000° C.

Step 405—The heated precursor powder is ground, to obtain the layered oxide material.

The method for preparing a layered oxide material provided in this embodiment is useful in the preparation of the layered oxide material according to Embodiment 1. The method provided in this embodiment is simple and feasible, the cost is low and the materials used are safe and nontoxic, so that the method is applicable to large-scale production.

Embodiment 5

Figure 5:
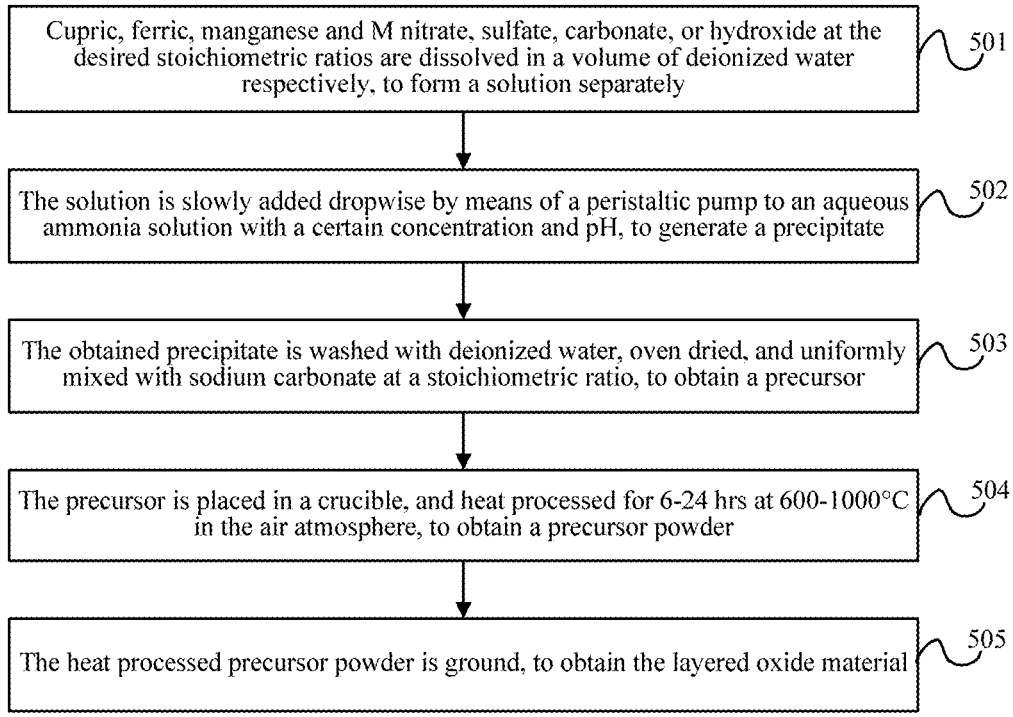
FIG. 5 is a flow chart of a method for preparing a layered copper-containing oxide material through co-precipitation provided in Embodiment 5 of the present invention.

This embodiment provides a method for preparing a layered oxide material, which is specifically co-precipitation, and includes the following steps as shown in FIG. 5, Step 501—Cupric, ferric, manganese and M nitrate, sulfate, carbonate, or hydroxide the desired stoichiometric ratios are dissolved in a deionized water respectively, to form a. solution separately.

M is specifically one or more of $Li^+$, $Ni^{2+}$, $Mg^{2+}$, $Mn^{2+}$, $Zn^{2+}$, $Co^{2+}$, $Ca^{2+}$, $Ba^{2+}$, $Sr^{2+}$, $Mn^{3+}$, $Al^{3+}$, $B^{3+}$, $Cr^{3+}$, $Co^{3+}$, $V^{3+}$, $Zr^{4+}$, $Ti^{4+}$, $Sn^{4+}$, $V^{4+}$, $Mo^{4+}$, $Mo^{5+}$, $Ru^{5+}$, $Nb^{5+}$, $Si^{4+}$, $Sb^{5+}$, $Nb^{5+}$, $Mo^{6+}$, and $Te^{6+}$.

Step 502—The solution is slowly added dropwise by means of a peristaltic pump to an aqueous ammonia solution with a certain concentration and to generate a precipitate.

Step 503—The obtained precipitate is washed with deionized water, oven dried, and uniformly mixed with sodium carbonate at a stoichiometric ratio, to obtain a precursor.

Step 504—The precursor is placed in a crucible, and heated for 6-24 hrs at 600-1000° C. in the air atmosphere, to obtain a precursor powder.

Step 505—The heated precursor powder is ground, to obtain the layered oxide material.

The method for preparing a layered oxide material provided in this embodiment is useful in the preparation of the layered oxide material according to Embodiment 1. The method provided in this embodiment is simple and feasible, the cost is low and the materials used are safe and nontoxic, so that the method is applicable to large-scale production.

For better understanding of the technical solution provided in the present invention, specific processes for preparing the layered oxide materials by using the methods provided in the embodiments above of the present invention are described by way of several specific examples, and also a method for fabricating a secondary battery using the layered oxide material and battery performance are provided.

Embodiment 6

In this embodiment, a layered oxide material was prepared by using the solid-state reaction as described in Embodiment 2. The process was as follows.

$Na_2CO_3$ (analytical pure), $Fe_2O_3$ (analytical pure), CuO, and $Mn_2O_3$ were mixed at the desired stoichiometric ratios, and ground for half an hour in an agate mortar, to obtain a precursor. The precursor was compressed, then transferred to an $Al_2O_3$ crucible, and processed for 12 hrs in a muffle furnace at 850° C., to obtain a layered oxide material $NaCu_{0.2}Fe_{0.4}Mn_{0.4}O_2$ as a black powder. FIG. 1 shows an XRD pattern of the layered oxide material. It can be seen from the XRD pattern that $NaCu_{0.2}Fe_{0.4}Mn_{0.4}O_2$ is an oxide having a layered structured O3 phase in its crystal structure.

The prepared layered oxide material was used as a positive electrode active material in the preparation of sodium-ion batteries. The specific steps were as follows. The prepared $NaCu_{0.2}Fe_{0.4}Mn_{0.4}O_2$ powder was mixed with acetylene black and the binder polyvinylidene fluoride (PVDF) at a weight ratio of 80:10:10, to which a suitable amount of N-methylpyrrolidone (NMP) solution was added, and ground at normal temperature in a dry environment, to form a slurry. The slurry was evenly coated onto an aluminium foil as a current collector, dried with infrared light, and out into an electrode of (8×8) $mm^2$. The electrode was dried for 10 hrs at 110° C. under vacuum, and then transferred to a glove box for use.

Figure 6:
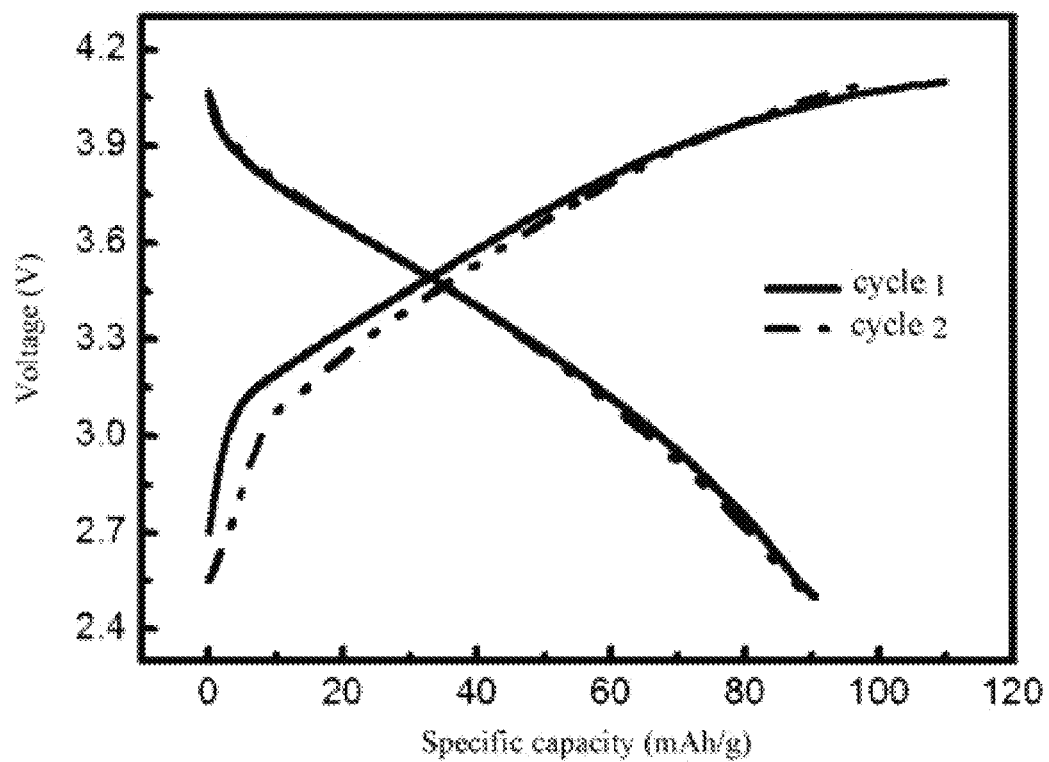
FIG. 6 shows charge/discharge curves for a sodium-ion battery provided in Embodiment 6 of the present invention.

The assembly of an analog battery was conducted in the glove box under an Ar atmosphere. A CR2032 button battery was assembled with the metal sodium as a counter electrode and with the $NaClO_4$/diethyl carbonate (EC:DEC) solution as an electrolyte. A galvanostatic Charge-discharge test was carried out at a current rate of C/10 in the voltage ranges of 2.5 V-4.1 V. The test results are shown in FIG. 6. FIG. 6 shows charge-discharge curves for first and second cycles. It can be seen that the specific discharge capacity in first cycle can be up to 90.4 mAh/g, the coulombic efficiency in first cycle is about 82.3%, and the cycling stability is quite good.

Embodiment 7

In this embodiment, a layered oxide material was prepared by using the solid-state reaction as described in Embodiment 2.

Figure 7:
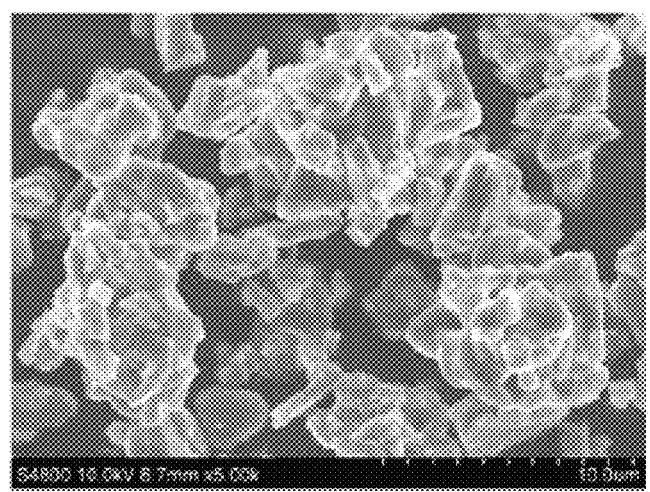
FIG. 7 is an SEM image of $NaCu_{0.15}Fe_{0.4}Mn_{0.35}O_2$ provided in Embodiment 7 of the present invention.

In this embodiment, the specific preparation steps were the same as those in Embodiment 6, except that different stoichiometric amounts of the precursor compounds $Na_2CO_3$ (analytical pure), NiO (analytical pure), $Fe_2O_3$, CuO, $Mn_2O_3$, and $MnO_2$ were used, and the heating was continued for 10 hrs at 950° C. A layered oxide material $NaCu_{0.15}Fe_{0.4}Mn_{0.35}Ni_{0.1}O_2$ as a black powder was obtained. FIG. 1 shows an XRD pattern of the layered oxide material. FIG. 7 is a scanning electron microscope (SEM) image of $NaCu_{0.15}Fe_{0.4}Mn_{0.35}Ni_{0.1}O_2$. It can be seen from the figure that the particle size distribution of the material is mainly from 1 to 10 μm.

Figure 8:
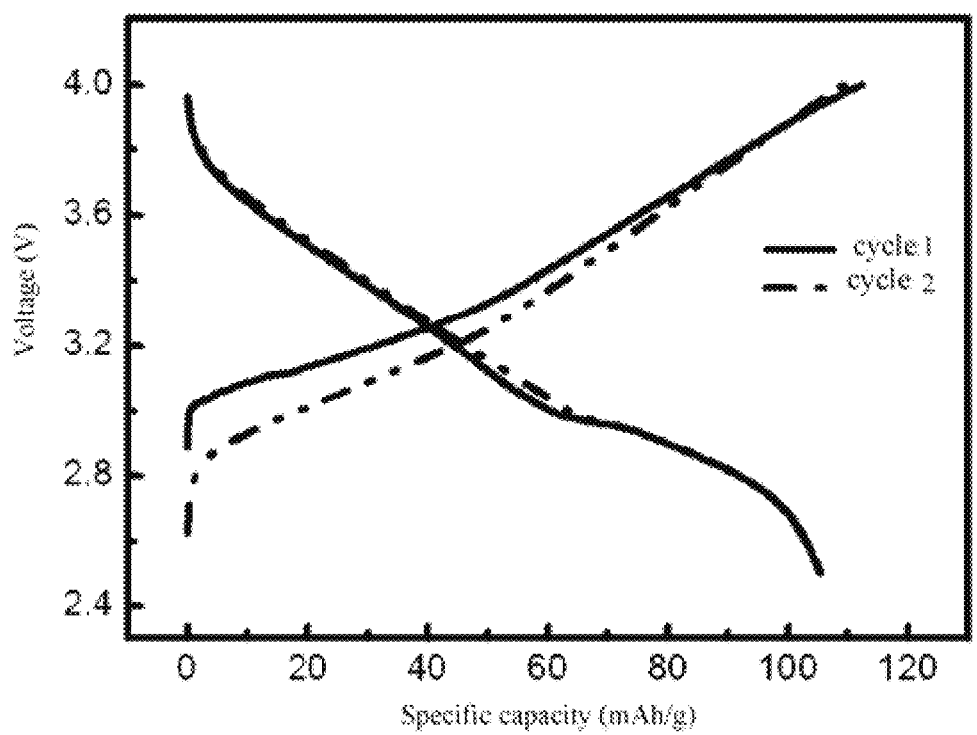
FIG. 8 shows charge/discharge curves for a sodium-ion battery provided in Embodiment 7 of the present invention.

The prepared layered oxide material was used as a positive electrode active material in the preparation of sodium-ion batteries, and the electrochemical charge-discharge test was conducted. The preparation process and the test method were the same as those in Embodiment 6. The test voltage was in the range of 2.5-4.0 V. The test results are shown in FIG. 8. FIG. 8 shows charge-discharge curves in cycles 1 and 2. It can be seen that the specific discharge capacity in initial cycle can be up to 105.3 mAh/g, and the coulombic efficiency in initial cycle is about 93.8%.

Embodiment 8

In this embodiment, a layered oxide material was prepared by using the solid-state reaction as described in Embodiment 2.

In this embodiment, the specific preparation steps were the same as those in Embodiment 6, except that different stoichiometric amounts of the precursor compounds $Na_2CO_3$ (analytical pure), $Fe_2O_3$, CuO, $MnO_2$, and $TiO_2$ were used. A layered oxide material $NaCu_{0.1}Fe_{0.5}Mn_{0.3}Ti_{0.1}O_2$ as a black powder was obtained. FIG. 1 shows an XRD pattern of the layered oxide material.

Figure 9:
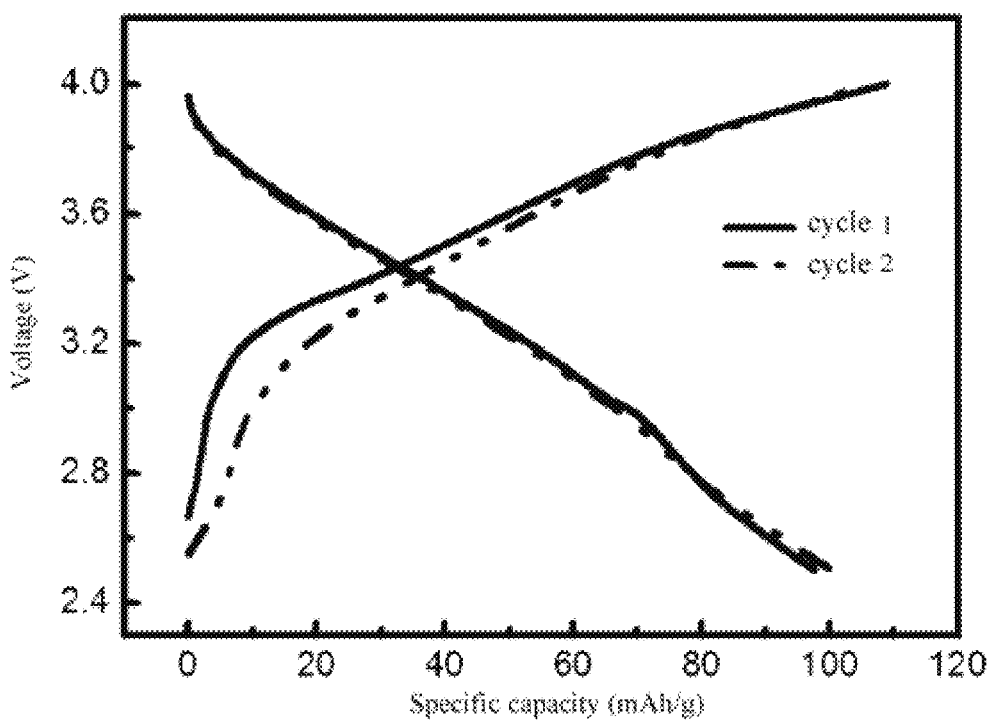
FIG. 9 shows charge/discharge curves for a sodium-ion battery provided in Embodiment 8 of the present invention.

The prepared layered oxide material was used as a positive electrode active material in the preparation of sodium-ion batteries, and the electrochemical charge-discharge test was conducted. The preparation process and the test method were the same as those in Embodiment 6. The test voltage was in the ranges of 2.5-4.0 V. The test results are shown in FIG. 9. FIG. 9 shows charge-discharge curves in cycles 1 and 2. It can be seen that the specific discharge capacity in initial cycle can be up to 97.6 mAh/g, and the coulombic efficiency in initial cycle is about 89.7%, Embodiment 9

In this embodiment, a layered oxide material was prepared by using the solid-state reaction as described in Embodiment 2.

In this embodiment, the specific preparation steps were the same as those in Embodiment 6, except that different stoichiometric amounts of the precursor compounds $Na_2CO_3$ (analytical pure), $Fe_2O_3$, CuO, $Mn_2O_3$ and $TiO_2$ were used. A layered oxide material $NaCu_{0.2}Fe_{0.4}Mn_{0.3}Ti_{0.1}O_7$ as a black powder was obtained. The XRD pattern of the layered oxide material is similar to FIG. 1.

Figure 10:
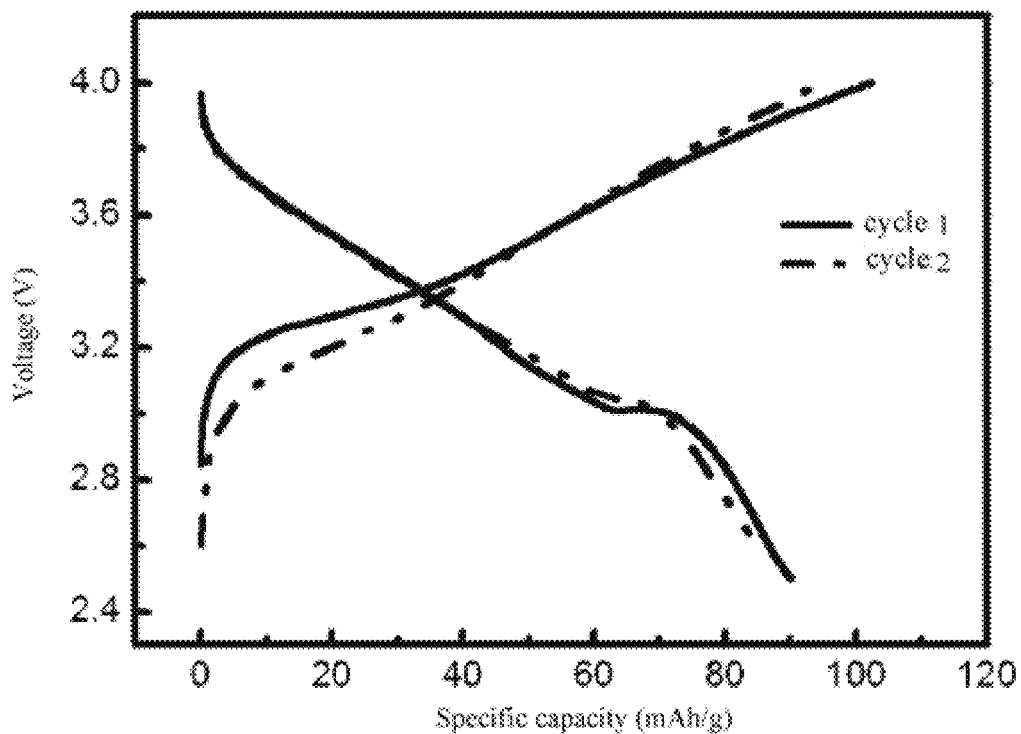
FIG. 10 shows charge/discharge curves for a sodium-ion battery provided in Embodiment 9 of the present invention.

The prepared layered oxide material was used as a positive electrode active material in the preparation of sodium-ion batteries and the electrochemical charge-discharge test was conducted. The preparation process and the test method were the same as those in Embodiment 6. The test voltage was in the range of 2.5-4.0 V. The test results are shown in FIG. 10. FIG. 10 shows charge-discharge curves in cycles 1 and 2. It can be seen that the specific discharge capacity in initial cycle can be up to 90.1 mAh/g, and the coulombic efficiency in initial cycle is about 88%.

Embodiment 10

In this embodiment, a layered oxide material was prepared by using the solid-state reaction as described in Embodiment 2.

In this embodiment, the specific preparation steps were the same as those in Embodiment 6, except that different stoichiometric amounts of the precursor compounds $NaCO_2O_3$ (analytical pure), $Fe_2O_3$, CuO, $Mn_2O_3$, and $MnO_2$ were used. A layered oxide material $Na_{0.9}Cu_{0.225}Fe_{0.3}Mn_{0.475}O_2$ as a black powder was obtained. The XRD pattern of the layered oxide material is similar to FIG. 1.

Figure 11:
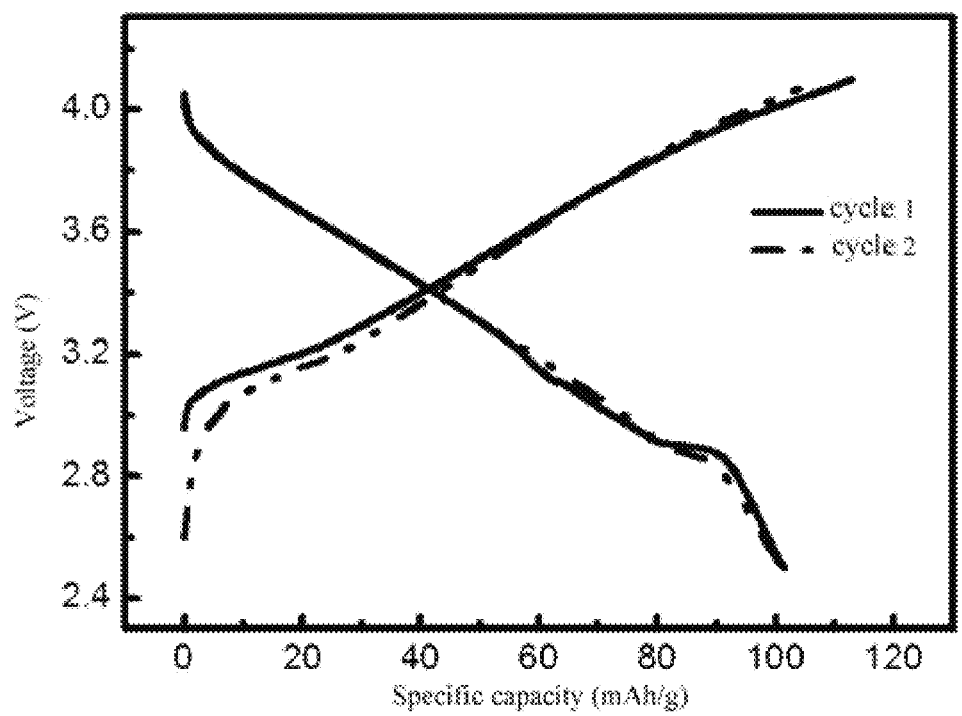
FIG. 11 shows charge/discharge curves for a sodium-ion battery provided in Embodiment 10 of the present invention.

The prepared layered oxide material was used as a positive electrode active material in the preparation of sodium-ion batteries and the electrochemical charge/discharge test was conducted. The preparation process and the test method were the same as those in Embodiment 6. The test voltage was in the range of 2.5-4.1 V. The test results are shown in FIG. 11. FIG. 11 shows charge-discharge curves in cycles 1 and 2. It can be seen that the specific discharge capacity in initial cycle can be up to 101.4 mAh/g, and the coulombic efficiency in initial cycle is about 89.8%.

Embodiment 11

In this embodiment, a layered oxide material as prepared by using the solid-state reaction as described in Embodiment 2.

In this embodiment, the specific preparation steps were the same as those in Embodiment 6, except that different stoichiometric amounts of the precursor compounds $Na_2CO_3$ (analytical pure), $Fe_2O_3$, CuO, and $Mn_2O_3$ were used. A layered oxide material $Na_{0.833}Cu_{0.167}Fe_{0.333}Mn_{0.5}O_2$ as a black powder was obtained. The XRD pattern of the layered oxide material is shown in FIG. 1.

Figure 12:
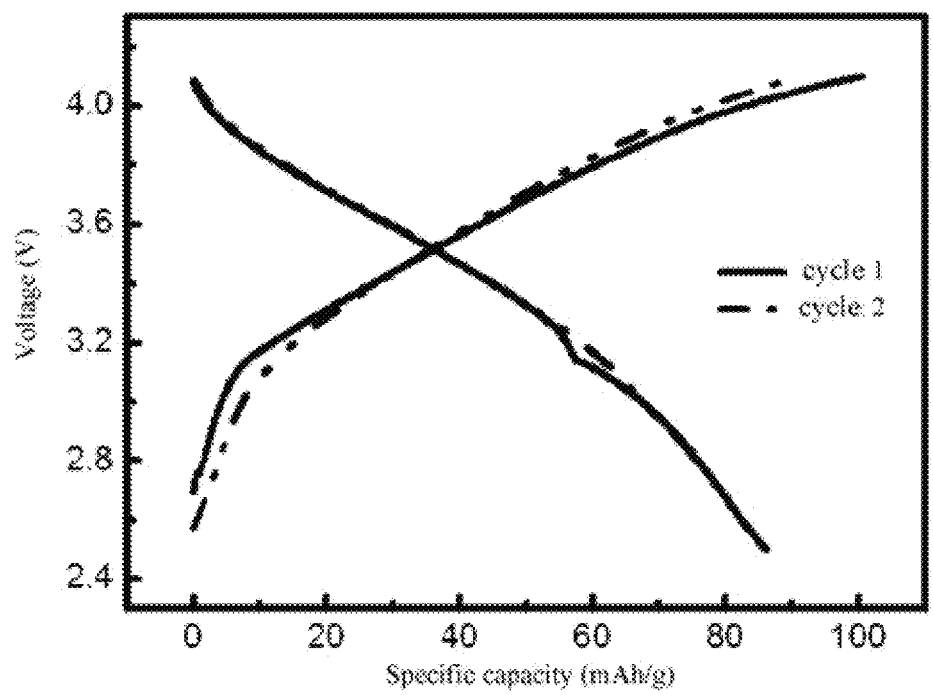
FIG. 12 shows charge/discharge curves for a sodium-ion battery provided in Embodiment 11 of the present invention.

The prepared layered oxide material was used as a positive electrode active material in the preparation of sodium-ion batteries and the electrochemical charge/discharge test was conducted. The preparation process and the test method were the same as those in Embodiment 6. The test voltage was in the ranges of 2.5-4.1 V. The test results are shown in FIG. 12. FIG. 12 shows charge-discharge curves in cycles 1 and 2. It can be seen that the specific discharge capacity in initial cycle can be up to 86.2 mAh/g, and the coulombic efficiency in initial cycle is about 85.7%.

Embodiment 12

In this embodiment, a layered oxide material was prepared by using the solid-state reaction as described in Embodiment 2.

In this embodiment, the specific preparation steps were the same as those in Embodiment 6, except that different stoichiometric amounts of the precursor compounds $Na_2CO_3$ (analytical pure), $Fe_2O_3$, CuO, and $Mn_2O_3$ were used. A layered oxide material $Na_{0.875}Cu_{0.2}Fe_{0.4}Mn_{0.4}O_2$ as a black powder was obtained. The XRD pattern of the layered oxide material is similar to FIG. 1.

Figure 13:
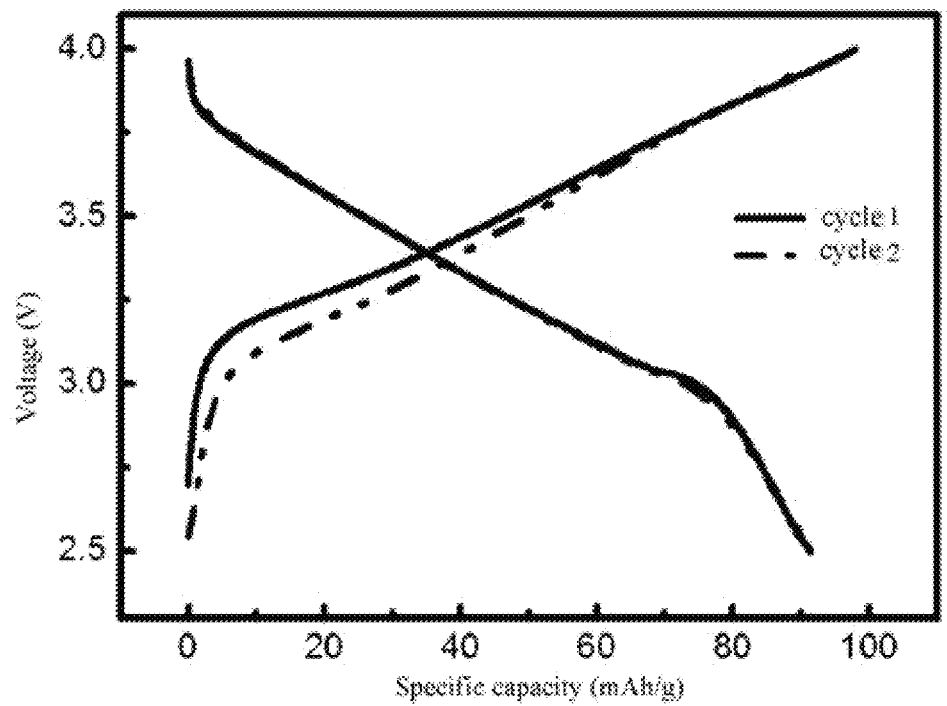
FIG. 13 shows charge/discharge curves for a sodium-ion battery provided in Embodiment 12 of the present invention.

The prepared layered oxide material was used as a positive electrode active material in the preparation of sodium-ion batteries and the electrochemical charge/discharge test was conducted. The preparation process and the test method were the same as those in Embodiment 6. The test voltage was in the range of 2.5-4.0 V. The test results are shown in FIG. 13. FIG. 13 shows charge-discharge curves in cycles 1 and 2. It can be seen that the specific discharge capacity in initial cycle can be up to 91.4 mAh/g, and the coulombic efficiency in initial cycle is about 93.3%.

Embodiment 13

In this embodiment, a layered oxide material was prepared by using the solid-state reaction as described in Embodiment 2.

In this embodiment, the specific preparation steps were the same as those in Embodiment 6, except that different stoichiometric amounts of the precursor compounds $Na_2CO_3$ (analytical pure), NiO, $Fe_2O_3$, CuO, $Mn_2O_3$ and $MnO_2$ were used. A layered oxide material $Na_{0.9}Cu_{0.2}Fe_{0.3}Mn_{0.43}Ni_{0.07}O_2$ as a black powder was obtained. FIG. 1 shows an XRD pattern of the layered oxide material.

Figure 14:
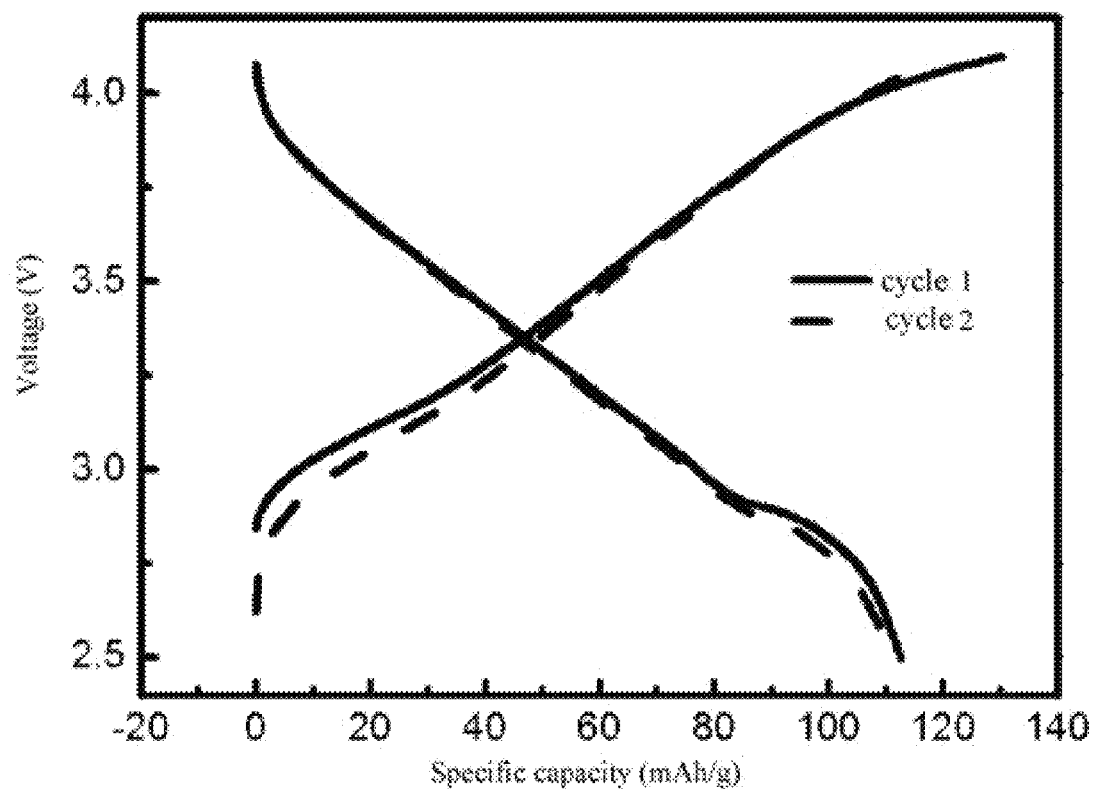
FIG. 14 shows charge/discharge curves for a sodium-ion battery provided in Embodiment 13 of the present invention.

The prepared layered oxide material was used as a positive electrode active material in the preparation of sodium-ion batteries and the electrochemical charge-discharge test was conducted. The preparation process and the test method were the same as those in Embodiment 6. The test voltage was in the range of 2.5-4.1 V. The test results are shown in FIG. 14. FIG. 14 shows charge-discharge curves in cycles 1, 3, and 5. It can be seen that the specific discharge capacity in initial cycle can be up to 112.6 mAh/g, and the coulombic efficiency in initial cycle is about 86.4%.

Embodiment 14

In this embodiment, a layered oxide material was prepared by using the solid-state reaction as described in Embodiment 2.

Figure 15:
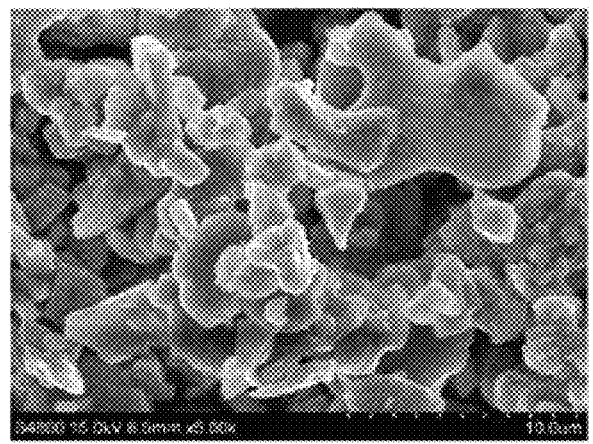
FIG. 15 is an SEM image of $Na_{0.9}Cu_{0.225}Fe_{0.3}Mn_{0.425}Al_{0.05}O_2$ provided in Embodiment 14 of the present invention.

In this embodiment, the specific preparation steps were the same as those in Embodiment 6, except that different stoichiometric amounts of the precursor compounds $Na_2CO_3$ (analytical pure), $Al_2O_3$, $Fe_2O_3$, CuO, $Mn_2O_3$ and $MnO_2$ were used. A layered oxide material $Na_{0.9}Cu_{0.225}Fe_{0.3}Mn_{0.425}Al_{0.05}O_2$ as a black powder was obtained. FIG. 1 shows an XRD pattern of the layered oxide material. FIG. 15 is an SEM image of $Na_{0.9}Cu_{0.225}Fe_{0.3}Mn_{0.425}Al_{0.05}O_2$. It can be seen from the figure that the particle size distribution of $Na_{0.9}Cu_{0.225}Fe_{0.3}Mn_{0.425}Al_{0.05}O_2$ is mainly from 1 to 10 μm.

Figure 16:
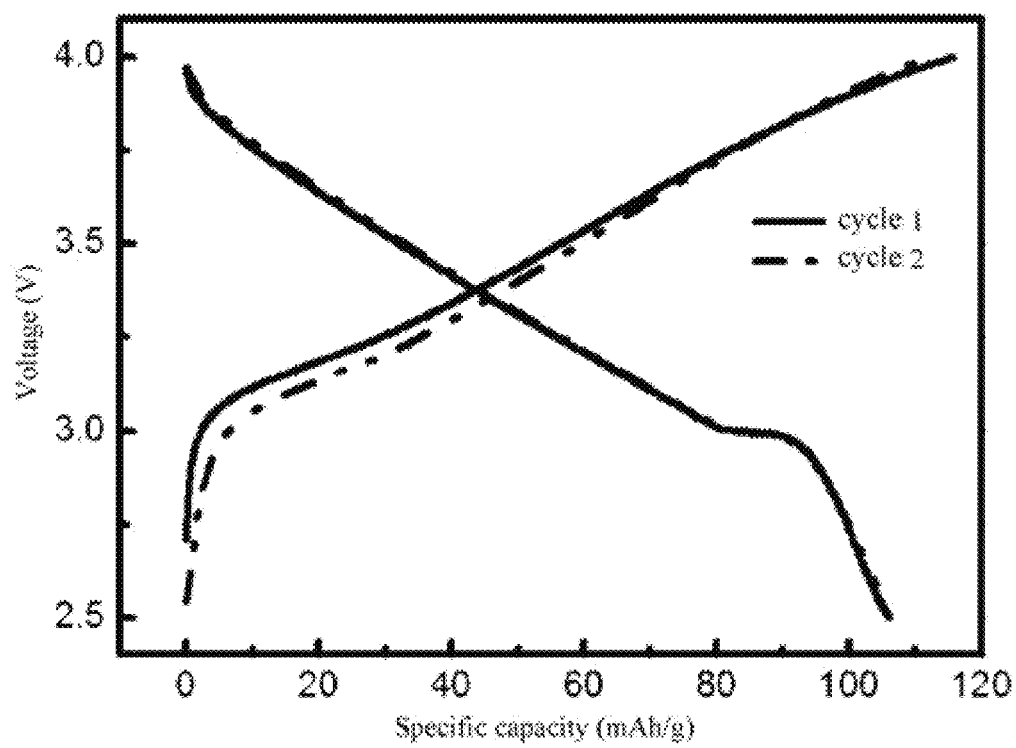
FIG. 16 shows charge/discharge curves for a sodium-ion battery provided in Embodiment 14 of the present invention.

The prepared layered oxide material was used as a positive electrode active material in the preparation of sodium-ion batteries and the electrochemical charge-discharge test was conducted. The preparation process and the test method were the same as those in Embodiment 6. The test voltage was in the range of 2.5-4.0 V. The test results are shown in FIG. 16. FIG. 16 shows charge-discharge curves in cycles 1 and 2. It can be seen that the specific discharge capacity in initial cycle can be up to 106.1 Ah/g, and the coulombic efficiency in initial cycle is 91.7%.

Embodiment 15

In this embodiment, a layered oxide material was prepared by using the solid-state reaction as described in Embodiment 2.

In this embodiment, the specific preparation steps were the same as those in Embodiment 6, except that different stoichiometric amounts of the precursor compounds $Na_2CO_3$ (analytical pure), $Fe_2O_3$, CuO, and $Mn_2O_3$ were used. A layered oxide material $Na_{0.95}C_{0.225}Fe_{0.35}Mn_{0.425}O_2$ as a black powder was obtained. The XRD pattern of the layered oxide material is similar to FIG. 1.

Figure 17:
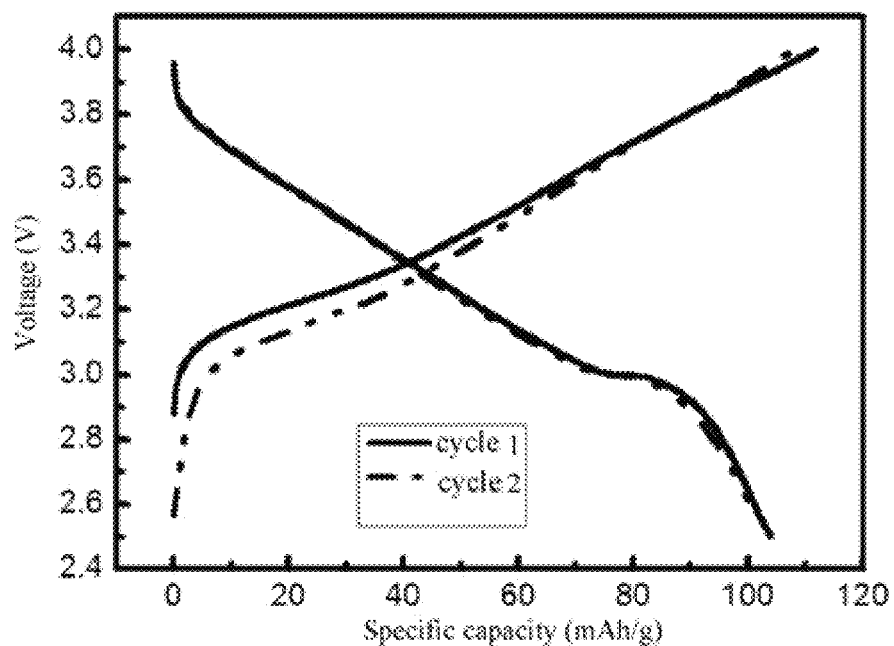
FIG. 17 shows charge/discharge curves for a sodium-ion battery provided in Embodiment 15 of the present invention.

The prepared layered oxide material was used as a positive electrode active material in the preparation of sodium-ion batteries and the electrochemical charge-discharge test was conducted. The preparation process and the test method were the same as those in Embodiment 6. The test voltage was in the range of 2.5-4.0 V. The test results are shown in FIG. 17. FIG. 17 shows charge-discharge curves in cycles 1 and 2. It can be seen that the specific discharge capacity in initial cycle can be up to 104 mAh/g, and the coulombic efficiency in initial cycle is about 93.1%.

Embodiment 16

In this embodiment, a layered oxide material was prepared by using the solid-state reaction as described in Embodiment 2.

In this embodiment, the specific preparation steps were the same as those in Embodiment 6, except that different stoichiometric amounts of the precursor compounds $Na_2CO_3$ (analytical pure), $Fe_2O_3$, CuO, $Mn_2O_3$ and $MnO_2$ were used. A layered oxide material $NaCu_{0.225}Fe_{0.3}Mn_{0.475}O_2$ as a black powder was obtained. The XRD pattern of the layered oxide material is similar to FIG. 1.

Figure 18:
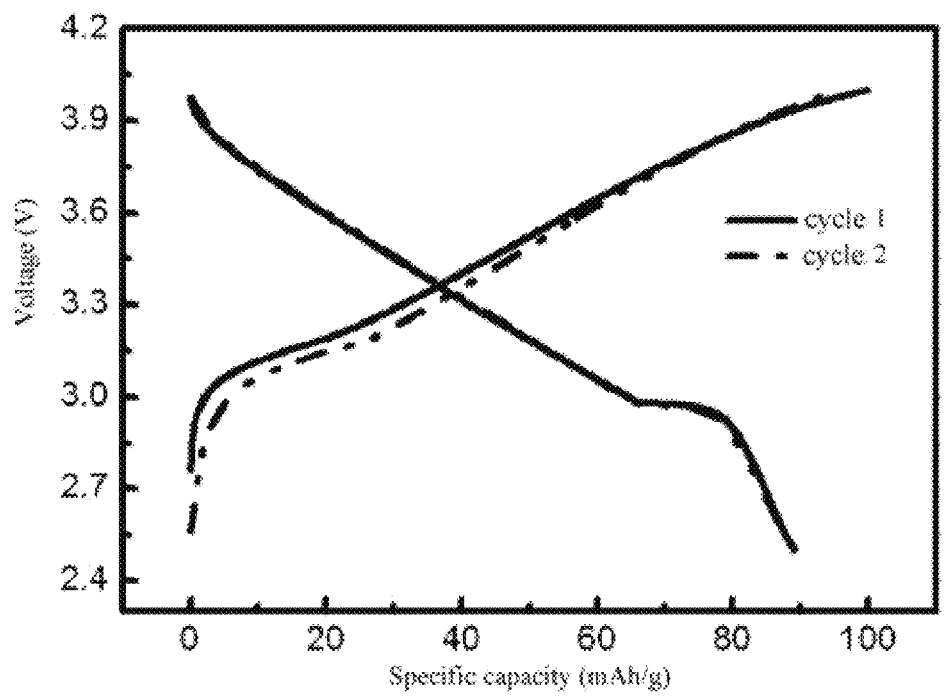
FIG. 18 shows charge/discharge curves for a sodium-ion battery provided in Embodiment 16 of the present invention.

The prepared layered oxide material was used as a positive electrode active material in the preparation of sodium-ion batteries and the electrochemical charge-discharge test was conducted. The preparation process and the test method were the same as those in Embodiment 6. The test voltage was in the range of 2.5-4.0 V. The test results are shown in FIG. 18. FIG. 18 shows charge-discharge curves in cycles 1 and 2. It can be seen that the specific discharge capacity in initial cycle can be up to 89.1 mAh/g, and the coulombic efficiency in initial cycle is about 89.2%.

Embodiment 17

In this embodiment, a layered oxide material was prepared by using the solid-state reaction as described in Embodiment 2.

In this embodiment, the specific preparation steps were the same as those in Embodiment 6, except that different stoichiometric amounts of the precursor compounds $Na_2CO_3$ (analytical pure), $Fe_2O_3$, CuO, and $Mn_2O_3$ were used. A layered oxide material $Na_{0.875}Cu_{0.22}Fe_{0.25}Mn_{0.53}O_2$ as a black powder was obtained. The XRD pattern of the layered oxide material is similar to FIG. 1.

Figure 19:
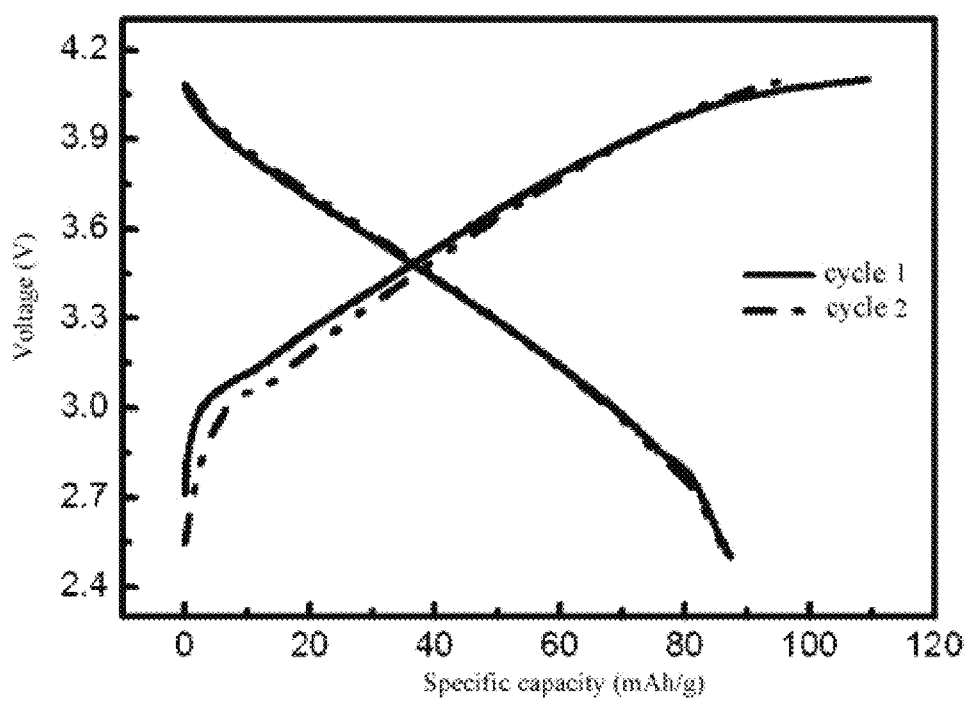
FIG. 19 shows charge/discharge curves for a sodium-ion battery provided in Embodiment 17 of the present invention.

The prepared layered oxide material was used as a positive electrode active material in the preparation of sodium-ion batteries and the electrochemical charge-discharge test was conducted. The preparation process and the test method were the same as those in Embodiment 6. The test voltage was in the range of 2.5-4.1 V. The test results are shown in FIG. 19. FIG. 19 shows charge-discharge curves in cycles 1 and 2. It can be seen that the specific discharge capacity in initial cycle can be up to 87.4 mAh/g, and the coulombic efficiency in initial cycle is about 80.0%.

Embodiment 18

In this embodiment, a layered oxide material was prepared by using the solid-state reaction as described in Embodiment 2.

In this embodiment, the specific preparation steps were the same as those in Embodiment 6, except that different stoichiometric amounts of the precursor compounds $Na_2CO_3$ (analytical pure), $Fe_2O_3$, CuO, $Mn_2O_3$ and $MnO_2$ were used. A layered oxide material $Na_{0.833}Cu_{0.2}Fe_{0.4}Mn_{0.4}O_2$ as a black powder was obtained. The XRD pattern of the layered oxide material is similar to FIG. 1.

Figure 20:
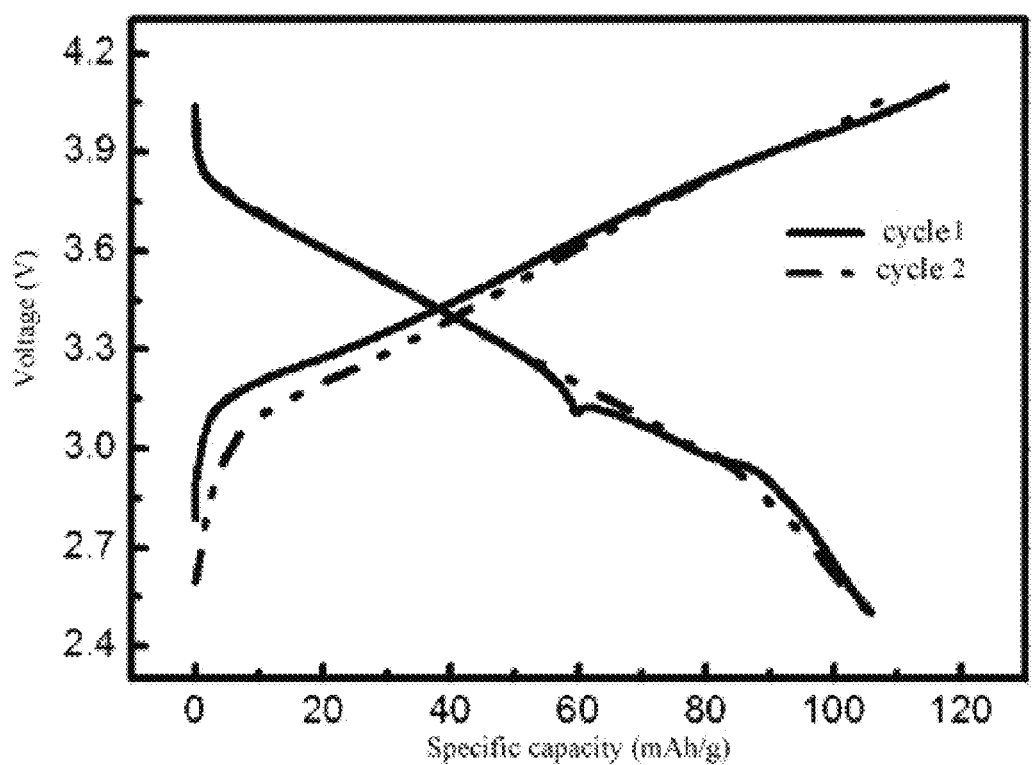
FIG. 20 shows charge/discharge curves for a sodium-ion battery provided in Embodiment 18 of the present invention.

The prepared layered oxide material was used as a positive electrode active material in the preparation of sodium-ion batteries and the electrochemical charge-discharge test was conducted. The preparation process and the test method were the same as those in Embodiment 6. The test voltage was in the range of 2.5-4.1 V. The test results are shown in FIG. 20. FIG. 20 shows charge-discharge curves in cycles 1 and 2. It can be seen that the specific discharge capacity in initial cycle can be up to 105.9 mAh/g, and the coulombic efficiency in initial cycle is about 90.2%.

Embodiment 19

In this embodiment, a layered oxide material was prepared by using spray drying as described in Embodiment 3.

Figure 21:
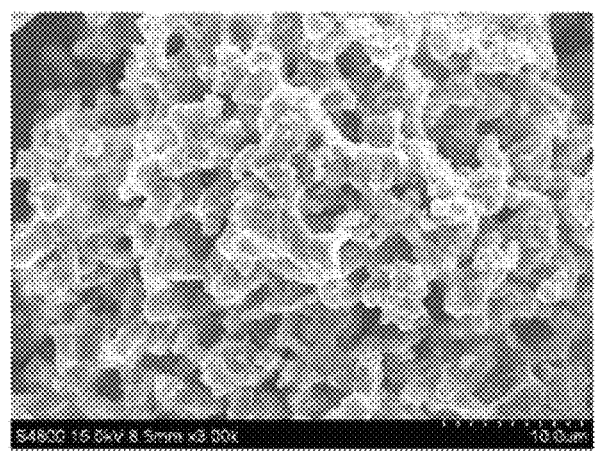
FIG. 21 is an SEM image of $Na_{0.9}Cu_{0.225}Fe_{0.3}Mh_{0.475}O_2$ provided in Embodiment 19 of the present invention.

In this embodiment, sodium nitrate, cupric nitrate, ferric nitrate, and manganese acetate were weighed at stoichiometric ratios and used as a precursor. The precursor was dissolved in water, to obtain a clear solution. The solution was placed in a spray drier, and subjected to spray drying at 130° C. The sprayed precursor was collected, transferred to an alumina crucible, and heated for 6 hrs in a muffle furnace at 750° C. in the air atmosphere, to obtain a layered oxide material $Na_{0.9}Cu_{0.225}Fe_{0.3}Mn_{0.475}O_2$ as a dark brown powder. The XRD pattern of the layered oxide material is similar to FIG. 1. FIG. 21 is an SEM image of $Na_{0.9}Cu_{0.225}Fe_{0.3}Mn_{0.475}O_2$. It can be seen from the figure that the material has an average particle size of 1 μm.

Figure 22:
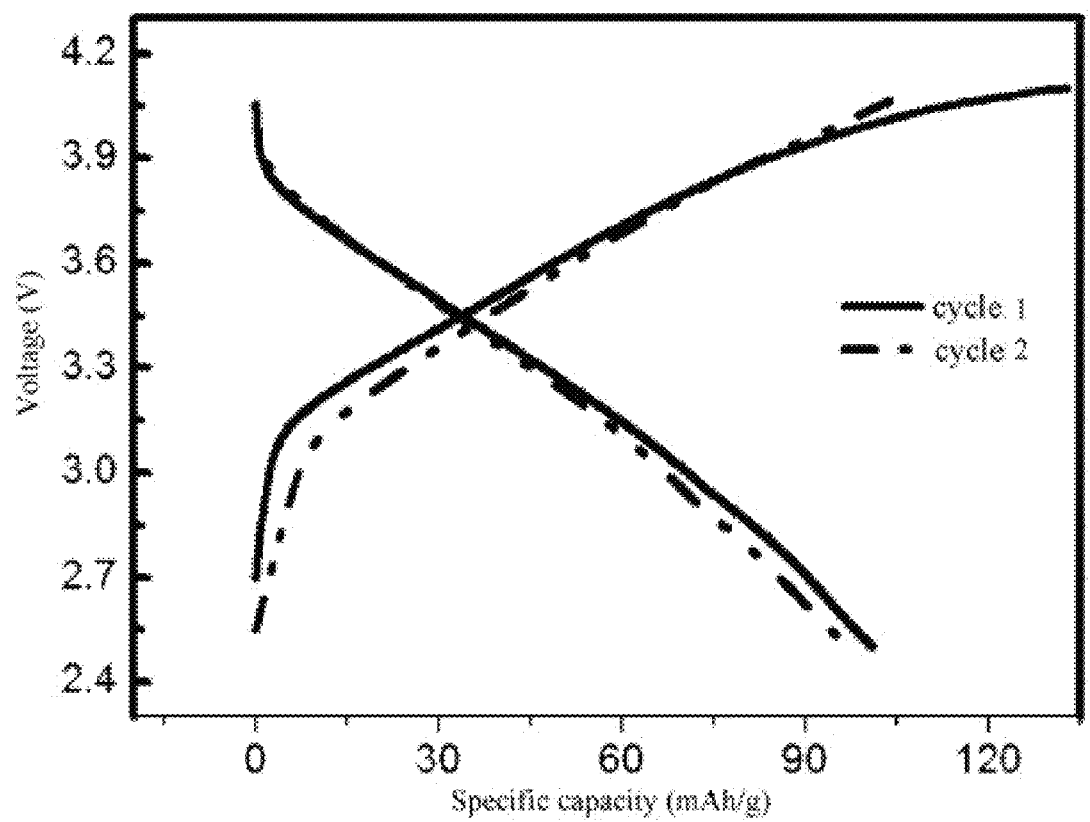
FIG. 22 shows charge/discharge curves for a sodium-ion battery provided in Embodiment 19 of the present invention.

The prepared layered oxide material was used as a positive electrode active material in the preparation of sodium-ion batteries and the electrochemical charge-discharge test was conducted. The preparation process and the test method were the same as those in Embodiment 6. The test voltage was in the range of 2.5-4.1 V. The test results are shown in FIG. 22. FIG. 22 shows charge-discharge curves in cycles 1 and 2. It can be seen that the specific discharge capacity in initial cycle can be up to 101 mAh/g, and the coulombic efficiency in initial cycle is about 76%.

Embodiment 20

In this embodiment, a layered oxide material was prepared by using the sol-gel process as described in Embodiment 4.

Figure 23:
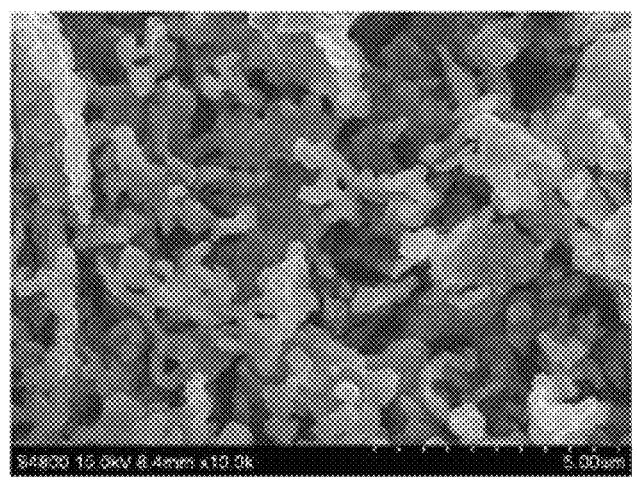
FIG. 23 is an SEM image of $Na_{0.9}Cu_{0.225}Fe_{0.3}Mn_{0.475}O_2$ provided in Embodiment 20 of the present invention.

In this embodiment, the specific preparation steps were as follows. The precursor compounds $NaNO_3$, $Fe(NO_3)_3$, $Cu(NO_3)_2$, and $Mn(C_2H_3O_2)_2$ were weighed at stoichiometric ratios and dissolved in deionized water in sequence. Then a suitable amount of citric acid was added as a chelating agent, and stirred while in an oil bath at 80° C. The dry gel obtained after evaporation to dryness was transferred to an alumina crucible, presintered for 2 hrs at 200° C. and then heated for 10 hrs in a muffle furnace at 750° C. in the air atmosphere, to obtain a layered oxide material $Na_{0.9}Cu_{0.225}Fe_{0.3}Mn_{0.475}O_2$ as a reddish to blackish brown powder. The XRD pattern of the layered oxide material is similar to FIG. 1. FIG. 23 is an SEM image of $Na_{0.9}Cu_{0.225}Fe_{0.3}Mn_{0.475}O_2$. It can be seen from the figure that the particle size distribution of the material is mainly from 500 nm to 1 μm.

Figure 24:
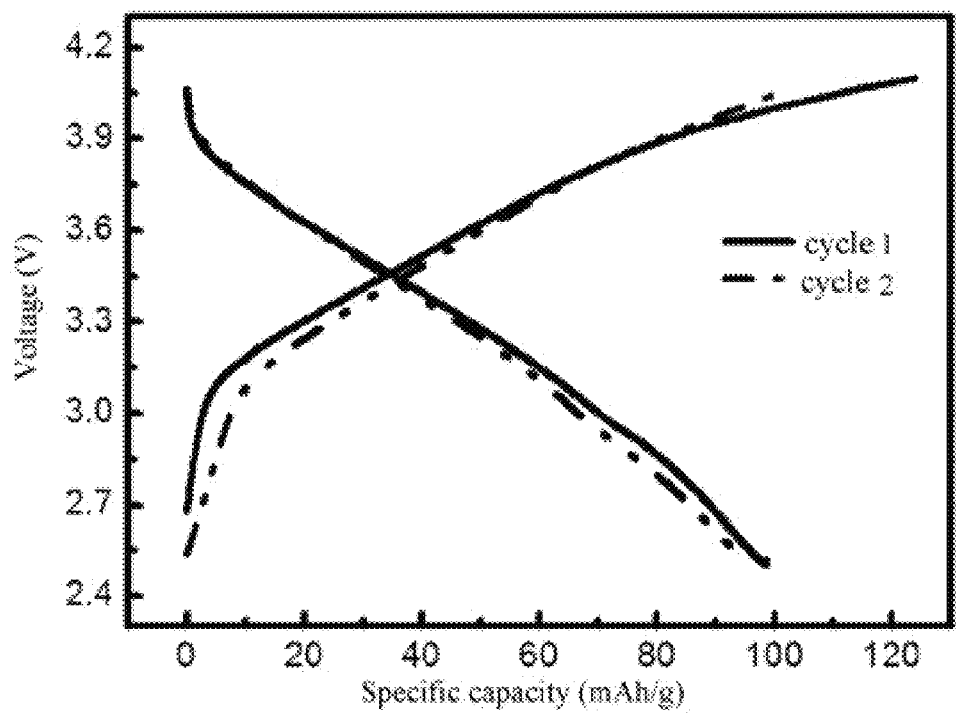
FIG. 24 shows charge/discharge curves for a sodium-ion battery provided in Embodiment 20 of the present invention.

The prepared layered oxide material was used as a positive electrode active material in the preparation of sodium-ion batteries and the electrochemical charge-discharge test was conducted. The preparation process and the test method were the same as those in Embodiment 6. The test voltage was in the range of 2.5-4.1 V. The test results are shown in FIG. 24. FIG. 24 shows charge-discharge curves in cycles 1 and 2. It can be seen that the specific discharge capacity in initial cycle can be up to 98.6 mAh/g, the coulombic efficiency in initial cycle is about 79.6%, and the cycling stability is quite good.

Embodiment 21

In this embodiment, a layered oxide material was prepared by using the sol-gel process as described in Embodiment 4.

In this embodiment, the specific preparation steps were the same as those in Embodiment 20, except that different stoichiometric amounts of the precursor compounds $NaNO_3$, $Fe(NO_3)_3$, $Cu(NO_3)_2$, and $Mn(C_2H_3O_2)_2$ were used, the obtained dry gel was transferred to an alumina crucible, presintered for 2 hrs at 200° C., and then heated for 10 hrs in a muffle furnace at 700° C. in the air atmosphere. A layered oxide material $Na_{0.9}Cu_{0.27}Fe_{0.3}Mn_{0.43}O_2$ as a reddish to blackish brown powder was obtained. The XRD pattern of the layered oxide material is similar to FIG. 1.

Figure 25:
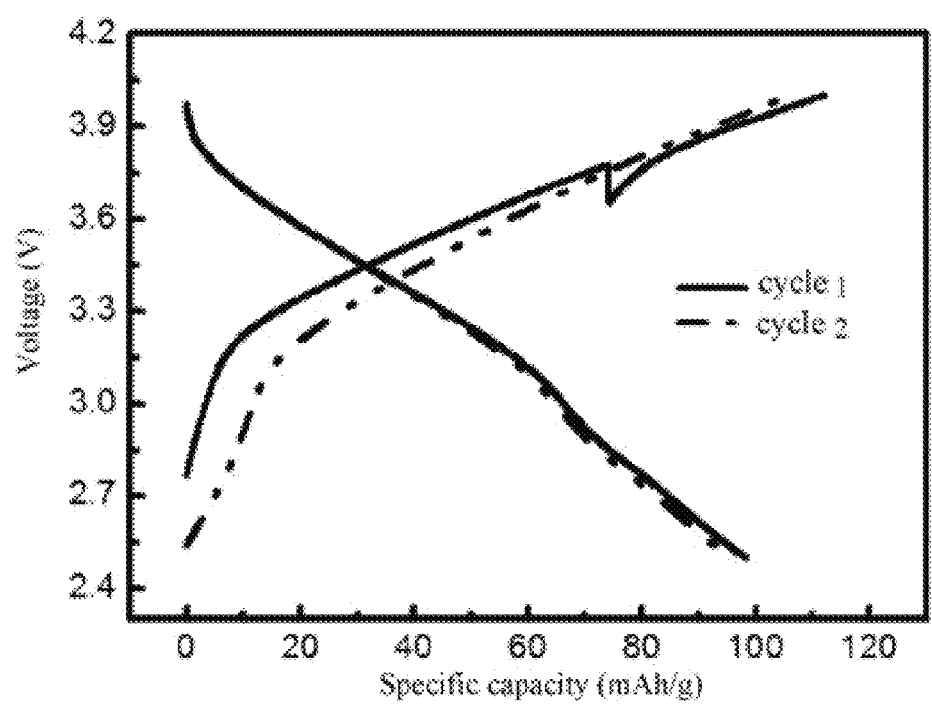
FIG. 25 shows charge/discharge curves for a sodium-ion battery provided in Embodiment 21 of the present invention.

The prepared layered oxide material was used as a positive electrode active material in the preparation of sodium-ion batteries and the electrochemical charge-discharge test was conducted. The preparation process and the test method were the same as those in Embodiment 6. The test voltage was in the range of 2.5-4.1 V. The test results are shown in FIG. 25. FIG. 25 shows charge-discharge curves in cycles 1 and 2. It can be seen that the specific discharge capacity in initial cycle can be up to 98.3 mAh/g, and the coulombic efficiency in initial cycle is about 87.8%.

Embodiment 22

In this embodiment, a layered oxide material was prepared by using co-precipitation as described in Embodiment 5. The process was specifically as follows.

The precursor compounds cupric nitrate, ferric nitrate, and manganese acetate were weighed at stoichiometric ratios and dissolved in deionized water respectively. The formulated solution of cupric nitrate, ferric nitrate, and manganese acetate in water was slowly added dropwise by means of a peristaltic pump to an aqueous ammonia solution with a certain concentration and After reaction, the generated precipitate was removed, washed with deionized water, and dried in a vacuum oven at 80° C. The dried powder was uniformly mixed with sodium carbonate at a stoichiometric ratio, to obtain a precursor. The precursor was transferred to a muffle furnace and heated at 800° C. for 12 hrs. The heated powder was ground to obtain a layered oxide material $Na_{0.95}Cu_{0.225}Fe_{0.25}Mn_{0.525}O_2$ as a black powder. The XRD pattern of the layered oxide material is similar to FIG. 1. The prepared layered oxide material was used as a positive electrode active material in the preparation of sodium-ion batteries and the electrochemical charge-discharge test was conducted. The preparation process and the test method were the same as those in Embodiment 6. The test voltage was in the range of 2.5-4.1 V. The specific discharge capacity in initial cycle can be up to 99 mAh/g, and the coulombic efficiency in initial cycle is about 89%.

Embodiment 23

In this embodiment, a layered oxide material was prepared by using the solid-state reaction as described in Embodiment 2.

In this embodiment, the specific preparation steps were the same as those in Embodiment 6, except that different stoichiometric amounts of the precursor compounds $Na_2CO_3$ (analytical pure), $Fe_2O_3$, CuO, $Mn_2O_3$, and MgO were used and the final heating was continued for 10 hrs at 950° C. A layered oxide material $Na_{0.9}Cu_{0.2}Fe_{0.3}Mn_{0.45}Mg_{0.05}O_2$ as a black powder was obtained. The XRD pattern of the layered oxide material is similar to FIG. 1. The prepared layered oxide material was used as a positive electrode active material in the preparation of sodium-ion batteries and the electrochemical charge-discharge test was conducted. The preparation process and the test method were the same as those in Embodiment 6. The test voltage was in the range of 2.5-4.1V. The specific discharge capacity in initial cycle can be up to 96 mAh/g, and the coulombic efficiency in initial cycle is about 90.1%.

Embodiment 24

In this embodiment, a layered oxide material was prepared by using the solid-state reaction as described in Embodiment 2.

In this embodiment, the specific preparation steps were the same as those in Embodiment 6, except that different stoichiometric amounts of the precursor compounds $Na_2CO_3$ (analytical pure), $Fe_2O_3$, CuO, $Mn_2O_3$ and $B_2O_3$ were used and the final heating was continued for 12 hrs at 900° C. A layered oxide material $Na_{0.9}Cu_{0.225}Fe_{0.3}Mn_{0.425}B_{0.05}O_2$ as a black powder was obtained. The XRD pattern of the layered oxide material is similar to FIG. 1. The prepared layered oxide material was used as a positive electrode active material in the preparation of sodium-ion batteries and the electrochemical charge-discharge test was conducted. The preparation process and the test method were the same as those in Embodiment 6. The test voltage was in the range of 2.5-4.1 V. The specific discharge capacity in initial cycle can be up to 98 mAh/g, and the coulombic efficiency in initial cycle is about 89%.

Embodiment 25

In this embodiment, a layered oxide material was prepared by using the solid-state reaction as described in Embodiment 2.

In this embodiment, the specific preparation steps were the same as those in Embodiment 6, except that different stoichiometric amounts of the precursor compounds $Na_2CO_3$ (analytical pure), $Fe_2O_3$, CuO, $Mn_2O_3$ and $Co_2O_3$ were used, and the final heating was continued for 12 hrs at 800° C. A layered oxide material $Na_{0.9}Cu_{0.225}Fe_{0.3}Mn_{0.455}Co_{0.02}O_2$ as a black powder was obtained. The XRD pattern of the layered oxide material is similar to FIG. 1. The prepared layered oxide material was used as a positive electrode active material in the preparation of sodium-ion batteries and the electrochemical charge-discharge test was conducted. The preparation process and the test method were the same as those in Embodiment 6. The test voltage was in the range of 2.5-4.1 V. The specific discharge capacity in initial cycle can be up to 107 mAh/g, and the coulombic efficiency in initial cycle is about 91.5%.

Embodiment 26

In this embodiment, a layered oxide material was prepared by using the solid-state reaction as described in Embodiment 2.

In this embodiment, the specific preparation steps were the same as those in Embodiment 6, except that different stoichiometric amounts of the precursor compounds $Na_2CO_3$ (analytical pure), $Fe_2O_3$, CuO, $Mn_2O_3$, and NiO were used, and the final heating was continued for 12 hrs at 800° C. A layered oxide material $Na_{0.9}Cu_{0.225}Fe_{0.3}Mn_{0.425}M_{0.05}O_2$ as a black powder was obtained. The XRD pattern of the layered oxide material is similar to FIG. 1.

Figure 26:
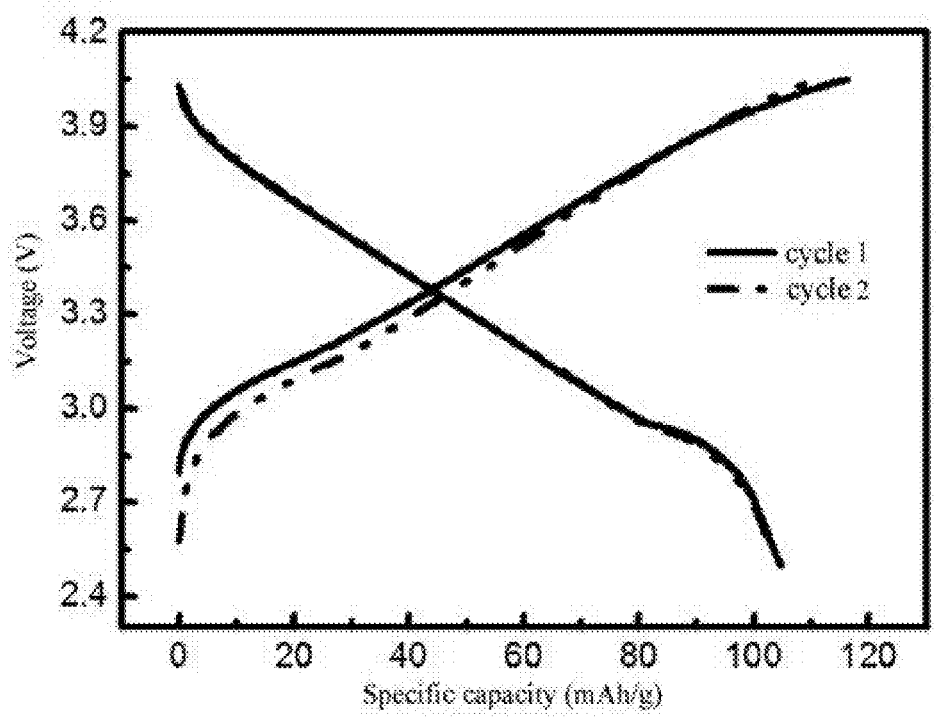
FIG. 26 shows charge/discharge curves for a sodium-ion battery provided in Embodiment 26 of the present invention.
Figure 27:
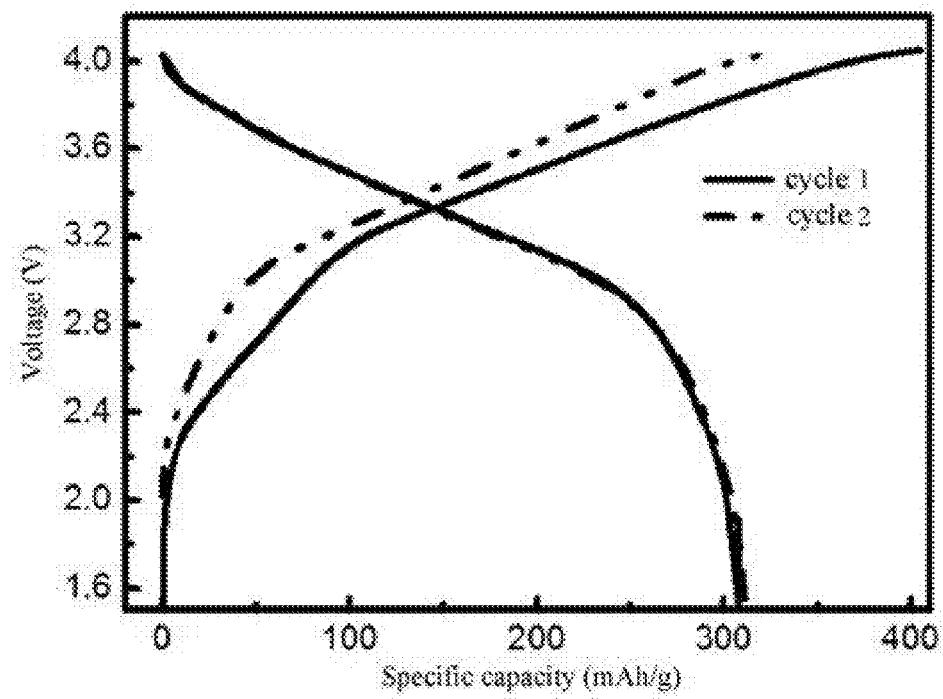
FIG. 27 shows charge/discharge curves for a sodium-ion battery provided in Embodiment 26 of the present invention.

The prepared layered oxide material was used as a positive electrode active material in the preparation of sodium-ion batteries and the electrochemical charge-discharge test was conducted. The preparation process and the test method were the same as those in Embodiment 6. The test voltage was in the range of 2.5V-4.05V. The test results are shown in FIG. 26. FIG. 26 shows charge-discharge curves in cycles 1 and 2. It can be seen that the specific discharge capacity in initial cycle can be up to 104.7 mAh/g, and the coulombic efficiency in initial cycle is about 90.1%. A full cell was assembled with this material as cathode and hard carbon as anode. The test voltage was in the range of 1.5-4.05 V. The test results are shown in FIG. 27. FIG. 27 shows charge-discharge curves at a current of C/5 in cycles 1 and 2. It can be seen that the specific discharge capacity in initial cycle is 307.9 mAh/g (calculated from the weight of the negative electrode active material), and the coulombic efficiency in initial cycle is about 76%.

The layered oxide material provided in embodiments of the present invention is simply prepared, and contains transition metal elements including copper, iron, and manganese that are nontoxic and safe and have a high abundance in the earth's crust, and thus the preparation cost is low. The sodium-ion secondary battery using the layered oxide material according to the present invention has a high charge capacity in initial cycle, an excellent cycle performance, and a high safety, by virtue of the valence change from divalent to trivalent copper, from trivalent to tetravalent iron, and from trivalent to tetravalent manganese, and thus are of great utility value in solar power generation, wind power generation, peak load regulation of smart power grid, and large-scale energy storage equipment such as distribution power stations, backup power sources, or communication base stations.

The objectives, technical solutions, and beneficial effects of the present invention are described in further details with reference to specific embodiments above. It should be understood that the forgoing descriptions are only specific embodiments of the present invention, and are not intended to limit the protection scope of the present invention. Any modifications, equivalent replacements, and improvements made without departing from the spirit and principle of the present invention fall within the protection scope of the present invention.

What is claimed is:

1. A battery having a layered oxide material having a general chemical formula $Na_xCu_iFe_jMn_kM_yO_{2+\beta}$:
   wherein M is an element that is doped for replacing the transition metals, and is specifically one or more of $Li^+$, $Ni^{2+}$, $Mg^{2+}$, $Mn^{2+}$, $Zn^{2+}$, $Co^{2+}$, $Ca^{2+}$, $Ba^{2+}$, $Sr^{2+}$, $Mn^{3+}$, $Al^{3+}$, $B^{3+}$, $Cr^{3+}$, $Co^{3+}$, $V^{3+}$, $Zr^{4+}$, $Ti^{4+}$, $Sn^{4+}$, $V^{4+}$, $Mo^{4+}$, $Mo^{5+}$, $Ru^{4+}$, $Nb^{5+}$, $Si^{4+}$, $Sb^{5+}$, $Nb^{5+}$, $Mo^{6+}$, and $Te^{6+}$; and
   x, y, i, j, k, and β are respectively the molar ratios of respective elements, provided that x, y, i, j, k, and β satisfy the relations: $y+i+j+k=1$, and $x+my+2i+3j+4k=2(2+\beta)$, wherein $0.8 \leq x \leq 1$, $0 < i \leq 0.3$, $0 < j \leq 0.5$, $0 < k \leq 0.5$, $-0.02 \leq \beta \leq 0.02$, and m is the valence of M; and
   wherein the layered oxide material has a space group of $R\bar{3}m$.

2. The layered oxide material according to claim 1, which is a positive electrode active material for use in sodium-ion secondary batteries.

3. A method for preparing the layered oxide material according to claim 1 through a solid state reaction, comprising:
   mixing 100-108 wt % of the desired stoichiometric amount of sodium carbonate based on sodium and the desired stoichiometric amounts of cupric oxide, ferric oxide, manganese dioxide and M oxide in proportion to form a precursor, wherein M is specifically one or more of $Li^+$, $Ni^{2+}$, $Mg^{2+}$, $Mn^{2+}$, $Zn^{2+}$, $Co^{2+}$, $Ca^{2+}$, $Ba^{2+}$, $Sr^{2+}$, $Mn^{3+}$, $Al^{3+}$, $B^{3+}$, $Cr^{3+}$, $Co^{3+}$, $V^{3+}$, $Zr^{4+}$, $Ti^{4+}$, $Sn^{4+}$, $V^{4+}$, $Mo^{4+}$, $Mo^{5+}$, $Ru^{4+}$, $Nb^{5+}$, $Si^{4+}$, $Sb^{5+}$, $Nb^{5+}$, $Mo^{6+}$, and $Te^{6+}$;
   uniformly mixing the precursor by ball milling, to obtain a precursor powder;
   placing the precursor powder in a muffle furnace, and heating at 700-1000° C. for 2-24 hrs in the air atmosphere; and
   grinding the heat-processed precursor powder, to obtain the layered oxide material.

4. A method for preparing the layered oxide material according to claim 1 through spray drying, comprising:
   mixing 100-108 wt % of the desired stoichiometric amount of sodium carbonate based on sodium and the desired stoichiometric amounts of cupric oxide, ferric oxide, manganese dioxide and M oxide in proportion to form a precursor, wherein M is specifically one or more of $Li^+$, $Ni^{2+}$, $Mg^{2+}$, $Mn^{2+}$, $Zn^{2+}$, $Co^{2+}$, $Ca^{2+}$, $Ba^{2+}$, $Sr^{2+}$, $Mn^{3+}$, $Al^{3+}$, $B^{3+}$, $Cr^{3+}$, $Co^{3+}$, $V^{3+}$, $Zr^{4+}$, $Ti^{4+}$, $Sn^{4+}$, $V^{4+}$, $Mo^{4+}$, $Mo^{5+}$, $Ru^{4+}$, $Nb^{5+}$, $Si^{4+}$, $Sb^{5+}$, $Nb^{5+}$, $Mo^{6+}$, and $Te^{6+}$; and adding ethanol or water to the precursor and stirring until uniform to form a slurry;

subjecting the slurry to spray drying, to obtain a precursor powder;

placing the precursor powder in a muffle furnace, and heating at 650-1000° C. for 2-24 hrs in the air atmosphere; and grinding the heated precursor powder, to obtain the layered oxide material.

5. A method for preparing the layered oxide material according to claim 1 through spray drying, comprising:

using sodium nitrate, cupric nitrate, ferric nitrate, manganese acetate, and M nitrate at stoichiometric ratios as a precursor, wherein M is specifically one or more of $Li^+$, $Ni^{2+}$, $Mg^{2+}$, $Mn^{2+}$, $Zn^{2+}$, $Co^{2+}$, $Ca^{2+}$, $Ba^{2+}$, $Sr^{2+}$, $Mn^{3+}$, $Al^{3+}$, $B^{2+}$, $Cr^{3+}$, $Co^{3+}$, $V^{3+}$, $Zr^{4+}$, $Ti^{4+}$, $Sn^{4+}$, $V^{4+}$, $Mo^{4+}$, $Mo^{5+}$, $Ru^{4+}$, $Nb^{5+}$, $Si^{4+}$, $Sb^{5+}$, $Nb^{5+}$, $Mo^{6+}$, and $Te^{6+}$;

adding ethanol or water to the precursor and stirring until uniform to form a slurry;

subjecting the slurry to spray drying, to obtain a precursor powder;

placing the precursor powder in a muffle furnace, and heating at 650-1000° C. for 2-24 hrs in the air atmosphere; and grinding the heat-processed precursor powder, to obtain the layered oxide material.

6. A method for preparing the layered oxide material according to claim 1 through sol-gel process, comprising:

dissolving 100-108 wt % of the desired stoichiometric amount of sodium acetate, sodium nitrate, sodium carbonate, or sodium sulfate based on sodium, and cupric, ferric, manganese and the doped element M nitrate or sulfate at stoichiometric ratios in water or ethanol and mixing to form a precursor solution, wherein M is specifically one or more of $Li^+$, $Ni^{2+}$, $Mg^{2+}$, $Mn^{2+}$, $Zn^{2+}$, $Co^{2+}$, $Ca^{2+}$, $Ba^{2+}$, $Sr^{2+}$, $Mn^{3+}$, $Al^{3+}$, $B^{3+}$, $Cr^{3+}$, $Co^{3+}$, $V^{3+}$, $Zr^{4+}$, $Ti^{4+}$, $Sn^{4+}$, $V^{4+}$, $Mo^{4+}$, $Ru^{4+}$, $Mo^{5+}$, $Nb^{5+}$, $Si^{4+}$, $Sb^{5+}$, $Nb^{5+}$, $Mo^{6+}$, and $Te^{6+}$;

stirring at 50-100° C., adding a suitable amount of a chelating agent, and drying to form a precursor gel;

placing the precursor gel in a crucible, and presintering at 200-500° C. for 2 hrs in the air atmosphere;

further heating at 600-1000° C. for 2-24 hrs; and grinding the heated precursor powder, to obtain the layered oxide material.

7. A method for preparing the layered oxide material according to claim 1 through co-precipitation, comprising:

dissolving cupric, ferric, manganese and M nitrate, sulfate, carbonate, or hydroxide at the desired stoichiometric ratios in a deionized water respectively, to form a solution separately, wherein M is specifically one or more of $Li^+$, $Ni^{2+}$, $Mg^{2+}$, $Mn^{2+}$, $Zn^{2+}$, $Co^{2+}$, $Ca^{2+}$, $Ba^{2+}$, $Sr^{2+}$, $Mn^{3+}$, $Al^{3+}$, $B^{3+}$, $Cr^{3+}$, $Co^{3+}$, $V^{3+}$, $Zr^{4+}$, $Ti^{4+}$, $Sn^{4+}$, $V^{4+}$, $Mo^{4+}$, $Ru^{4+}$, $Mo^{5+}$, $Nb^{5+}$, $Si^{4+}$, $Sb^{5+}$, $Nb^{5+}$, $Mo^{6+}$, and $Te^{6+}$;

slowly adding the solution dropwise by means of a peristaltic pump to an aqueous ammonia solution with a certain concentration and pH, to generate a precipitate;

washing the obtained precipitate with deionized water, oven drying, and uniformly mixing with sodium carbonate at a stoichiometric ratio, to obtain a precursor;

placing the precursor in a crucible, and heating at 600-1000° C. for 6-24 hrs in the air atmosphere, to obtain a precursor powder; and grinding the heat-processed precursor powder, to obtain the layered oxide material.

8. A positive electrode for a sodium-ion secondary battery, comprising a current collector, a conductive additive coated on the current collector, a binder, and the layered copper-containing oxide material according to claim 1 thereon.

9. A sodium-ion secondary battery having the positive electrode according to claim 8.

10. The sodium-ion secondary battery according to claim 9 in solar power generation, wind power generation, peak load regulation of smart power grid, and large-scale energy storage equipment including distribution power stations, backup power sources, or communication base stations.

* * * * *